US012620591B2

(12) United States Patent
Jiang et al.

(10) Patent No.: US 12,620,591 B2
(45) Date of Patent: May 5, 2026

(54) MULTI-ELEMENT CATHODE MATERIAL, PREPARATION METHOD THEREOF, POSITIVE ELECTRODE PLATE, AND LITHIUM-ION BATTERY

(71) Applicant: BEIJING EASPRING MATERIAL TECHNOLOGY CO., LTD., Beijing (CN)

(72) Inventors: Huawei Jiang, Beijing (CN); Shunlin Song, Beijing (CN); Yafei Liu, Beijing (CN); Yanbin Chen, Beijing (CN)

(73) Assignee: BEIJING EASPRING MATERIAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/237,045

(22) Filed: Jun. 13, 2025

(65) Prior Publication Data

US 2025/0309258 A1 Oct. 2, 2025

Related U.S. Application Data

(63) Continuation of application No. PCT/CN2024/091055, filed on Apr. 30, 2024.

(30) Foreign Application Priority Data

Oct. 25, 2023 (CN) ......................... 202311394203.9

(51) Int. Cl.
*H01M 4/525* (2010.01)
*C01G 53/504* (2025.01)
(Continued)

(52) U.S. Cl.
CPC .......... *H01M 4/525* (2013.01); *C01G 53/504* (2025.01); *C01G 53/506* (2025.01); (Continued)

(58) Field of Classification Search
CPC ............ H01M 4/525; H01M 2004/021; C01G 53/504; C01G 53/506; C01P 2002/52; (Continued)

(56) References Cited

U.S. PATENT DOCUMENTS

2021/0017039 A1* 1/2021 Nagao .................. H01M 4/525

FOREIGN PATENT DOCUMENTS

CN 103441255 A 12/2013
CN 103930374 A 7/2014
(Continued)

OTHER PUBLICATIONS

International Search Report dated Jul. 17, 2024 in International Application No. PCT/CN2024/091055. English translation attached.
(Continued)

*Primary Examiner* — Daniel S Gatewood

(57) ABSTRACT

The present disclosure relates to the technical field of lithium-ion batteries, and particularly, to a multi-element cathode material, a preparation method thereof, a positive electrode plate, and a lithium-ion battery. The multi-electrode material is composed of secondary particles agglomerated by primary particles. A ratio of a total cross-sectional area of the primary particles with more than 5 grain boundaries to a cross-sectional area of the secondary particles is greater than or equal to 3:4. A porosity on a cross-section of the secondary particles is less than or equal to 2%. A grain boundary is a contour line of an interface between the primary particles with the same structure but different orientations on the cross-section of the secondary particles and a length of the grain boundary is greater than or equal to 0.1 μm.

19 Claims, 5 Drawing Sheets

(51) Int. Cl.
*C01G 53/506* (2025.01)
*H01M 4/02* (2006.01)

(52) U.S. Cl.
CPC ...... *C01P 2002/52* (2013.01); *C01P 2004/03* (2013.01); *C01P 2004/50* (2013.01); *C01P 2004/54* (2013.01); *C01P 2004/61* (2013.01); *C01P 2006/12* (2013.01); *C01P 2006/40* (2013.01); *H01M 2004/021* (2013.01)

(58) Field of Classification Search
CPC .............. C01P 2004/03; C01P 2004/50; C01P 2004/54; C01P 2004/61; C01P 2006/12; C01P 2006/40
See application file for complete search history.

(56) References Cited

FOREIGN PATENT DOCUMENTS

| | | | | |
|---|---|---|---|---|
| CN | 109713299 A | | 5/2019 | |
| CN | 111971254 A | | 11/2020 | |
| CN | 112538652 A | | 3/2021 | |
| CN | 116111081 A | | 5/2023 | |
| CN | 116885161 A | | 10/2023 | |
| CN | 117613210 A | | 2/2024 | |
| WO | WO-2021209079 A2 | * | 10/2021 | ............ H01M 4/505 |
| WO | 2022083120 A1 | | 4/2022 | |
| WO | WO-2022137359 A1 | * | 6/2022 | ............ H01M 4/505 |
| WO | 2022199399 A1 | | 9/2022 | |

OTHER PUBLICATIONS

First Office Action from corresponding Chinese Application No. 202311394203.9, dated Jul. 31, 2024. English translation attached.
The Grant Notice from corresponding Chinese Application No. 202311394203.9, dated Aug. 19, 2024. English translation attached.

* cited by examiner

MULTI-ELEMENT CATHODE MATERIAL, PREPARATION METHOD THEREOF, POSITIVE ELECTRODE PLATE, AND LITHIUM-ION BATTERY

PRIORITY INFORMATION

This application is a continuation of International Application No. PCT/CN2024/091055, filed on Apr. 30, 2024, which claims priority to and benefits of Chinese Patent Application No. 202311394203.9, filed with China National Intellectual Property Administration on Oct. 25, 2023. The disclosures of the aforementioned applications are hereby incorporated by reference in their entireties.

FIELD

The present disclosure relates to the technical field of lithium-ion batteries, and particularly, to a multi-element cathode material, a preparation method thereof, a positive electrode plate including the multi-element cathode material, and a lithium-ion battery including the positive electrode plate.

BACKGROUND

Lithium-ion batteries are mainly classified into cylindrical, prismatic, and pouch types. From small consumer products to power tools, and even in power batteries including energy storage, lithium-ion batteries have a wide range of application fields. Precisely due to strong demand, an output of the lithium-ion batteries has witnessed rapid growth, and manufacturing technologies thereof have advanced by leaps and bounds.

The manufacturing process of the lithium-ion batteries is relatively complicated, typically including steps such as homogenizing of the cathode material, coating, rolling, cutting, electrolyte injecting, and winding. Therefore, it is very important whether the cathode material can maintain sufficient stability in each manufacturing step. In the actual production process of lithium battery, manufacturers tend to increase the amount of the cathode material or apply a greater pressure in the rolling step in order to pursue the energy density of the lithium-ion batteries. However, the excessive pressure is likely to cause a phenomenon of fracture of the positive electrode plate, resulting in scrapping of the plate, and ultimately leading to a relatively high defect rate of the batteries. From the perspective of performance of the cathode material, the occurrence of the fracture of the plate is largely related to the structure of the cathode material itself.

Generally speaking, when designing the cathode material, the material is consciously designed to have a radial distribution in its cross-section in order to improve its cycle performance. However, during a process of manufacturing a battery plate, when a relatively large rolling pressure is applied to obtain a sufficient energy density, such cathode material will conduct the applied pressure along the radial direction to the aluminum foil plate coated with the cathode. The same direction of pressure, when amplified, is extremely easy to cause the fracture of the plate, which greatly increase a defect rate of the battery plate. This phenomenon will also affect electrical performance of the battery, especially the safety performance, high-temperature stability, and cycle performance of the battery, failing to meet the requirements of high safety for electric vehicle batteries.

SUMMARY

The object of the present disclosure is to overcome the problems that the existing battery plates are prone to fracture and cannot withstand a high rolling pressure, and the batteries assembled therefrom have low safety performance, low high-temperature stability, and low cycle performance, etc, and provide a multi-element cathode material, a preparation method thereof, a positive electrode plate, and a lithium-ion battery. The internal crystal grains of the multi-element cathode material are arranged in an irregular, non-radial, and disordered manner, endowing the multi-element cathode material with a higher powder pallet density and improved processability. Meanwhile, the positive electrode plate including the multi-element cathode material can easily withstand a higher rolling pressure and is less prone to fracture.

In order to achieve the above object, a first aspect of the present disclosure provides a multi-element cathode material. The multi-element cathode material is composed of secondary particles agglomerated by primary particles. A ratio of a total cross-sectional area of the primary particles with more than 5 grain boundaries to a cross-sectional area of the secondary particles is greater than or equal to 3:4, and a porosity on a cross-section of the secondary particles is less than or equal to 2%. The grain boundaries are each a contour line of an interface, on the cross-section of the secondary particles, between the primary particles with the same structure but different orientations, and the grain boundaries have each a length greater than or equal to 0.1 μm.

In the present disclosure, unless otherwise specified, the cross-section of the secondary particles refers to a cross-section obtained by ion milling, preferably a cross-section of particles obtained by ion milling with a cross-sectional diameter equal to an average particle size $DB_{50}$ of the secondary particles.

In the present disclosure, a method for obtaining the cross-section of the secondary particles used to determine the number of the grain boundaries is as follows.

S1, sample preparation. a, an aluminum foil of about 2×4 $cm^2$ and a silicon wafer of 1.5×1.5 $cm^2$ were cut for later use. The aluminum foil was folded in half, two edges thereof were flattened, and a gap was reserved in a middle part thereof for placing the sample. b, a conductive adhesive was added to cathode material powder, and mixed evenly. Then, the mixed material was picked and placed in the reserved gap of the aforementioned aluminum foil. Next, the aluminum foil was placed on a platform. First, the periphery of the sample was compacted with a flat plate, and then, the sample in the middle part was gently pressed to obtain a pre-treated sample. The surface of the pre-treated sample that was in contact with the platform was marked as a front side and the pressed surface was marked as a back side. c, the pre-treated sample was dried at a temperature of 100° C. for 60 minutes. After the drying, the pre-treated sample was taken out, and an excess part of the aluminum foil without the sample on the pre-treated sample was cut off. Then, the sample was cut vertically from the back side where the sample is sufficient. d, the above silicon wafer was taken and a glue was used to stick the back side of the cut pre-treated sample on the silicon wafer. In this way, the relatively flat front side of the sample can be closely attached to a baffle and face an ion beam directly. During the attachment, it should be ensured that the cut surface of the aluminum foil protruded beyond an edge of the silicon wafer, for example, by more than 60 μm, or was flush with it, to obtain a to-be-tested sample.

S2, measurement. A conductive tape was stuck on a side edge of a sample stage and the to-be-tested sample was fixed on the sample stage. An upper edge of the to-be-tested sample should be located at a higher level of about 1 mm to 3 mm than the sample stage. Then, the to-be-tested sample on the sample stage was subjected to an ion milling treatment. After the milling was completed, a liquid conductive adhesive was applied in the gap between the silicon wafer and the sample in the to-be-tested sample to increase conductivity. Finally, the treated sample stage was placed on a sample stage support dedicated for an electron microscope, and a position of the sample stage was tightly secured with an Allen wrench, to obtain a cross-section sample through observation by the electron microscope. An ion milling instrument used in the present disclosure was Hitachi Ion Milling Instrument System IM4000PLUS. Reference can be made to Table 1 for ion milling conditions:

TABLE 1

| Test items | Sample mass, g | Amount of liquid conductive adhesive, g | Acceleration voltage, kV | Deflection angle, ° | Operation duration, min |
|---|---|---|---|---|---|
| Precursor | 0.04 | 0.02 (1 drop) | 6 | C4 ± 30 | 40 |
| Aggregates | 0.04 | 0.02 (1 drop) | 6 | C4 ± 30 | 40 |
| Half-cell electrode plate | — | — | 6 | C6 ± 40 | 25 |
| Full-cell electrode plate | — | — | 6 | C6 ± 40 | 35 |

Based on an ion-milled cross-sectional image obtained by the above method, the particles with a cross-sectional diameter equal to the $DB_{50}$ of the secondary particles were screened out for observation, because such cross-section was a cross-section passing through or close to the center of the sphere, making it more representative. During the ion milling, STAGE CONT of the ion milling instrument should first be set to C4 mode, the operation duration should be adjusted to 40 minutes, the acceleration voltage should be 6 kV, a discharge voltage should be adjusted to its maximum value, and the airflow should be adjusted to 0.09 $cm^3$/min. The test conditions for the electron microscope were as follows: the low-voltage backscatter mode was adopted, with a voltage of 1 kV, a Working Distance (WD) of 2.5 mm, and a magnification of 10,000×.

Preferably, a powder pallet density of the multi-element cathode material is greater than or equal to 3.4 g/$cm^3$.

Preferably, the total residual alkali content of the multi-element cathode material satisfies: $m(Li_2CO_3)+m(LiOH)<6000$ ppm.

A second aspect of the present disclosure provides a method for preparing a multi-element cathode material. The method includes: step (1) of mixing a precursor having a composition represented by Formula (II) with a lithium source to obtain a mixture I, the precursor being agglomerated by primary crystal grains, and the primary crystal grains on a cross-section of the precursor being non-radially distributed; step (2) of performing a primary sintering on the mixture I in an oxygen-containing atmosphere to obtain an intermediate product, conditions for the primary sintering include: heating to a temperature T1 at a heating rate V1 and holding at T1 for a thermostatic duration t1; and then heating to a temperature T2 at a heating rate V2 and holding at T2 for a thermostatic duration t2; step (3) of mixing the intermediate product with a coating agent optionally containing G to obtain a mixture II; and step (4) of performing a secondary sintering on the intermediate product or the mixture II in an oxygen-containing atmosphere to obtain the multi-element cathode material. $(Ni_\alpha Co_\beta Mn_\gamma M_\delta)(OH)_2$ (II), where $0.3\leq\alpha<1$, $0<\beta<0.5$, $0<\gamma<0.5$, $0\leq\delta\leq0.05$, and $\alpha+\beta+\gamma+\delta=1$; and M and G are each independently selected from at least one element of Mg, Ti, W, V, Ta, Zr, La, Ce, Er, Sr, Si, B, Al, Co, and Y.

Preferably, the precursor is prepared by performing a coprecipitation reaction in an inert atmosphere on a mixed metallic salt solution containing a nickel source, a cobalt source, a manganese source, and an optional dopant containing M, and a precipitant, a complexing agent, and a dispersant to obtain a coprecipitation reaction product, and sequentially performing washing and drying on the obtained coprecipitation reaction product to obtain the precursor.

Preferably, conditions for the coprecipitation reaction include: a temperature ranging from 40° C. to 80° C., a pH value ranging from 10 to 13, and a stirring speed ranging from 200 rpm to 550 rpm.

Preferably, in step (2), the conditions for the primary sintering include: the heating rate V1 ranging from 1° C./min to 6° C./min, preferably, from 1° C./min to 3° C./min, and more preferably, from 1° C./min to 2° C./min; the temperature T1 ranging from 400° C. to 760° C., and preferably, from 500° C. to 750° C.; and the thermostatic duration t1 ranging from 2 hours to 6 hours, and preferably, from 3 hours to 5 hours; and the heating rate V2 ranging from 1° C./min to 6° C./min, and preferably, from 1° C./min to 3° C./min; the temperature T2 ranging from 710° C. to 950° C., and preferably, from 710° C. to 920° C.; and the thermostatic duration t2 ranging from 5 hours to 13 hours, and preferably, from 6 hours to 12 hours.

A third aspect of the present disclosure provides a positive electrode plate. An active material layer of the positive electrode plate includes the multi-element cathode material according to the first aspect of the present disclosure or the multi-element cathode material prepared by the method according to the second aspect of the present disclosure.

A fourth aspect of the present disclosure provides a lithium-ion battery. The lithium-ion battery includes the positive electrode plate according to the third aspect of the present disclosure.

Figure 6:
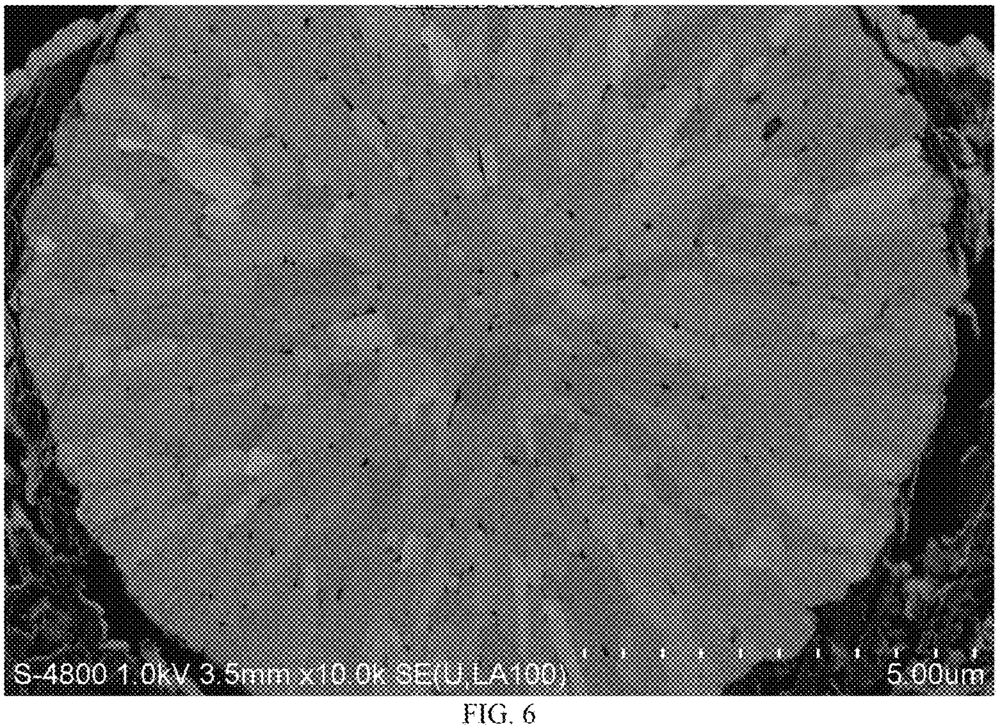

FIG. 6 is an image of an ion-milled cross-section of a multi-element cathode material DP1 prepared in Comparative Example 1.

Figure 7:
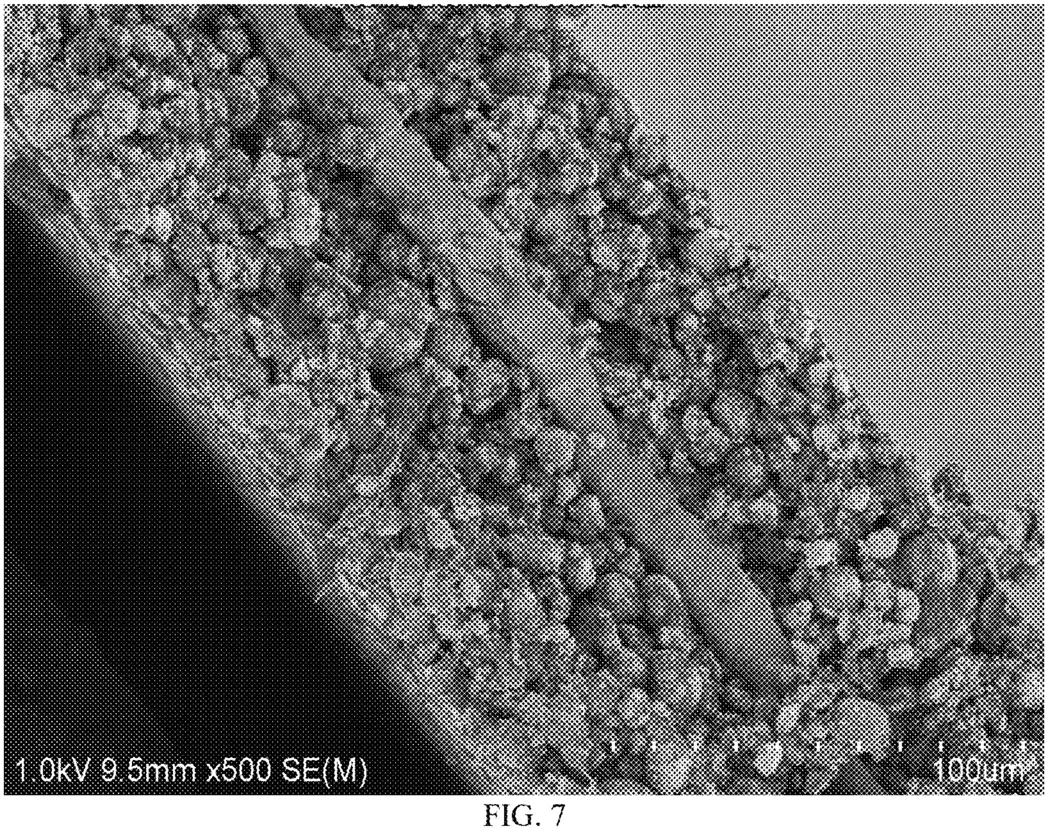

FIG. 7 is an SEM image of a single-fold cross-section of a positive electrode plate prepared by the multi-element cathode material P1 of Example 1.

Figure 8:
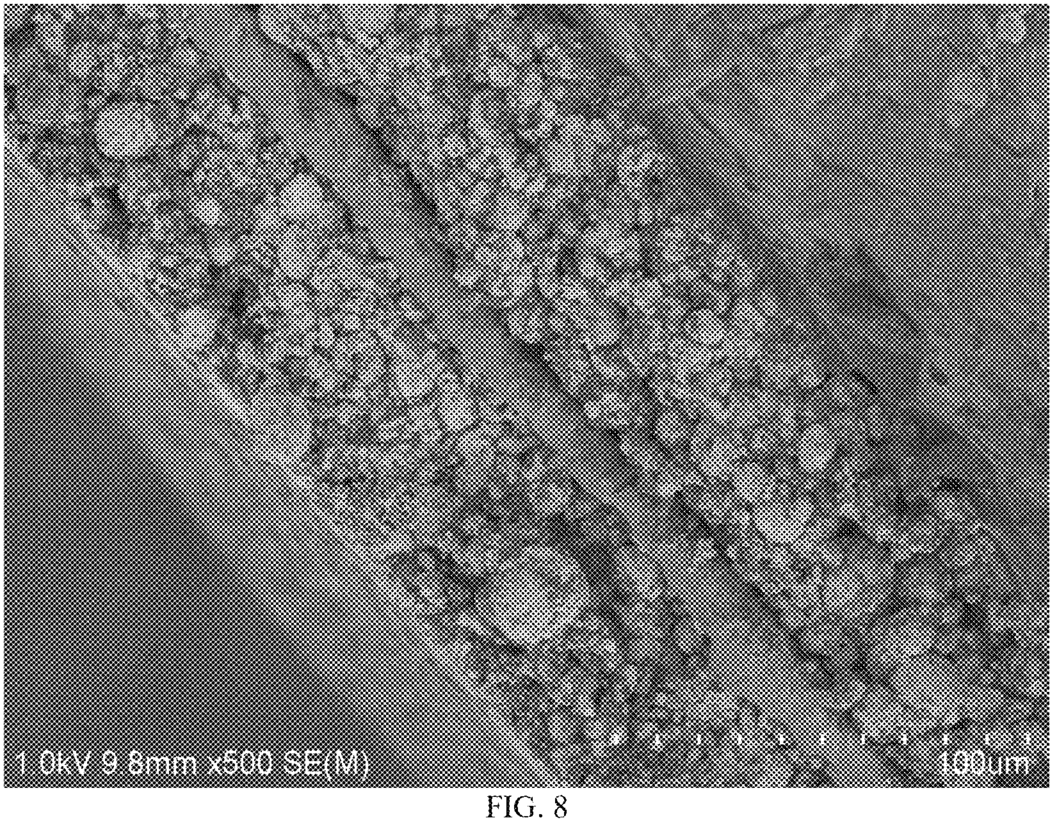

FIG. 8 is a SEM image of a double-fold cross-section of a positive electrode plate prepared by the multi-element cathode material P1 of Example 1.

Figure 9:
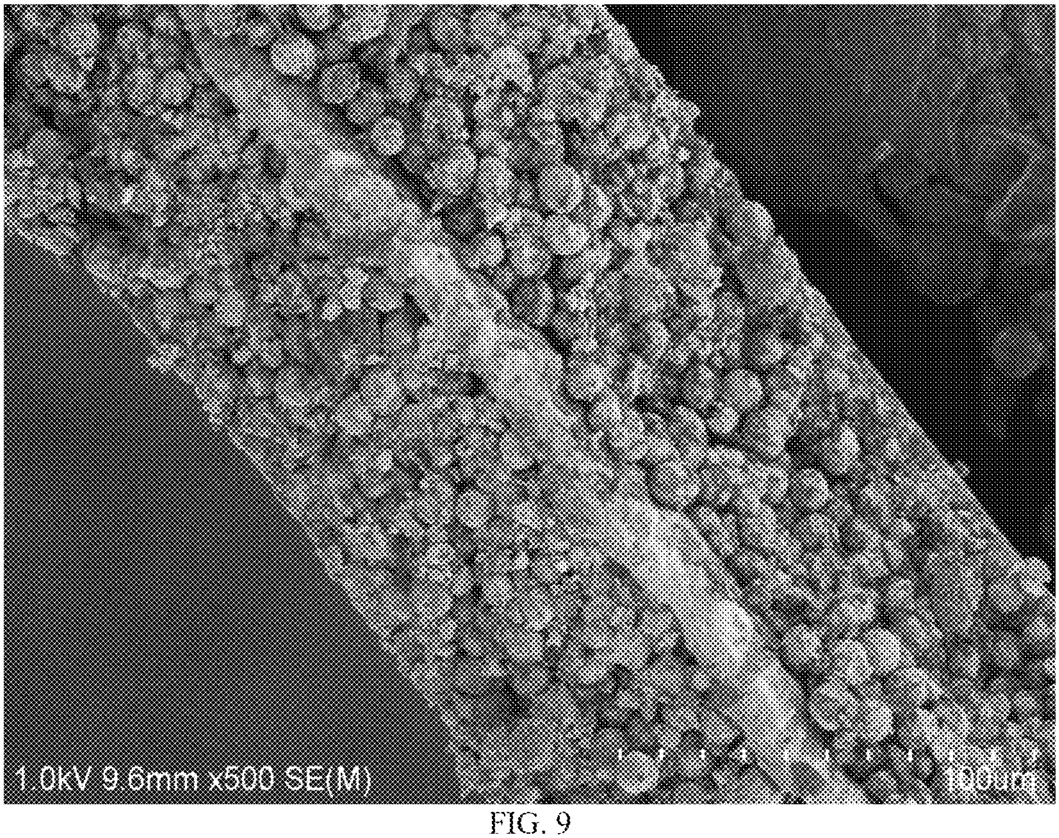

FIG. 9 is an SEM image of a single-fold cross-section of a positive electrode plate prepared by the multi-element cathode material DP1 of Comparative Example 1.

Figure 10:
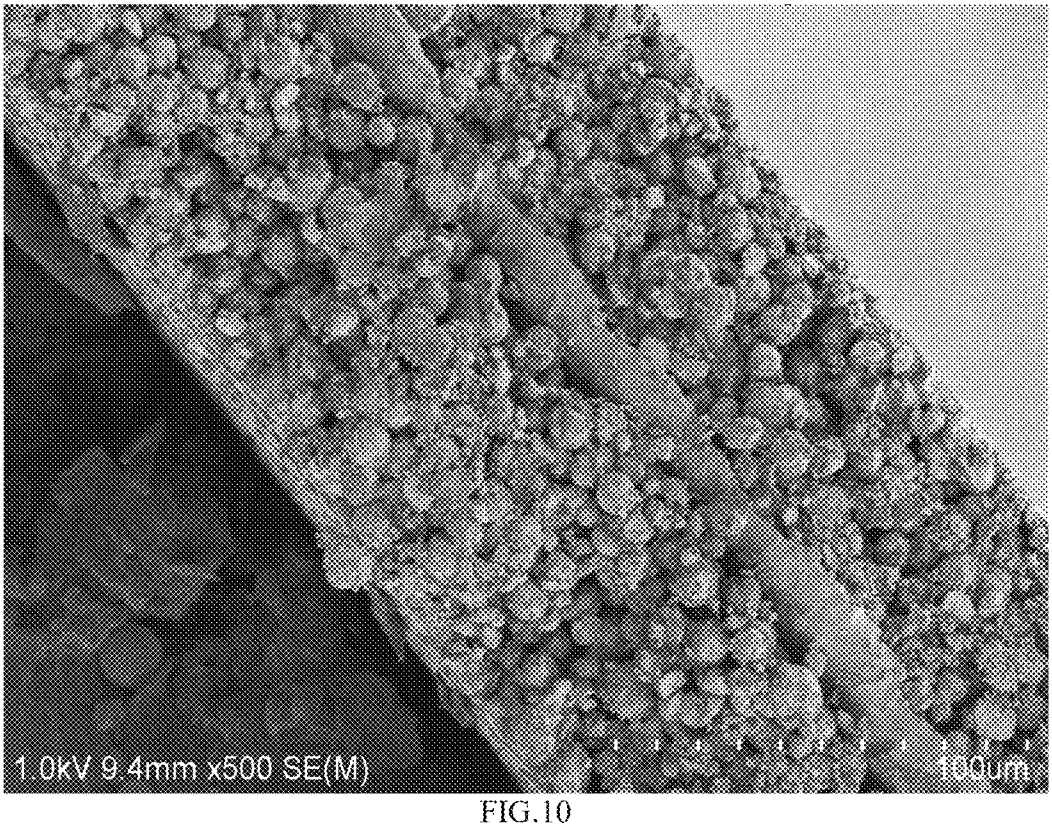

FIG. 10 is an SEM image of a double-fold cross-sectional of a positive electrode plate prepared by the multi-element cathode material DP1 of Comparative Example 1.

DETAILED DESCRIPTION OF THE EMBODIMENTS

The endpoint values or any values of the ranges disclosed in the present disclosure are not limited to the precise ranges or values. These ranges or values should be understood to include values close to these ranges or values. For numerical ranges, one or more new numerical ranges can be obtained by combining the endpoint values of the respective ranges, an endpoint value and an individual point value within the respective ranges, and individual point values within the respective ranges, and these numerical ranges should be regarded as specifically disclosed in the present disclosure.

A first aspect of the present disclosure provides a multi-element cathode material. The multi-element cathode material is composed of secondary particles agglomerated by primary particles. A ratio of a total cross-sectional area of the primary particles with more than 5 grain boundaries to a cross-sectional area of the secondary particles is greater than or equal to 3:4, and a porosity on a cross-section of the secondary particles is less than or equal to 2%. A grain boundary is a contour line of an interface between the primary particles with the same structure but different orientations on the cross-section of the secondary particles and a length of the grain boundary is greater than or equal to 0.1 μm.

In the present disclosure, unless otherwise specified, the cross-section of the secondary particle refers to a cross-section obtained by ion milling, and preferably, a cross-section of particles obtained by ion milling with a cross-sectional diameter equal to the $DB_{50}$ of the secondary particles. When the grain boundary meets the above conditions, the grain boundaries between the primary particles on the cross-section of the secondary particles are radially disordered, and the primary particles on the cross-section of the secondary particles are arranged in an interlacing pattern like canine teeth. The secondary particles will undergo creep and are not easily to fracture under ultimate compaction. When the multi-element cathode material is applied in the positive electrode plate, the fracture of the plate can be reduced.

In some embodiments of the present disclosure, preferably, the number of the grain boundaries having a length less than or equal to 1.5 μm accounts for more than 70% of the total number of the grain boundaries; preferably, the number of the grain boundaries having a length less than or equal to 1.2 μm accounts for more than 70% of the total number of grain boundaries; and more preferably, the number of the grain boundaries having a length ranging from 0.2 μm to 1.2 μm accounts for more than 80% of the total number of the grain boundaries.

In the present disclosure, the expression that "the number of the grain boundaries having a length less than or equal to 1.5 μm accounts for more than 70% of a total number of the grain boundaries" refers to that among the contour lines of the interfaces between the primary particles with the same structure but the different orientations on the cross-section of the secondary particles, the number of the contour lines having a length greater than or equal to 0.1 μm and less than or equal to 1.5 μm accounts for more than 70% of a total number of the contour lines having a length greater than or equal to 0.1 μm. That is, the number of the grain boundaries having a length greater than or equal to 0.1 μm and less than or equal to 1.5 μm accounts for more than 70% of the total number of the grain boundaries having a length greater than or equal to 0.1 μm.

Similarly, the expression that "the number of the grain boundaries having a length of less than or equal to 1.2 μm accounts for more than 70% of the total number of the grain boundaries" refers to the number of the grain boundaries having a length greater than or equal to 0.1 μm and less than or equal to 1.2 μm accounts for more than 70% of the total number of the grain boundaries having a length greater than or equal to 0.1 μm. The expression that "a number of the grain boundaries having a length ranging from 0.2 μm to 1.2 μm accounts for more than 80% of the total number of the grain boundaries" refers to the number of the grain boundaries having a length greater than or equal to 0.2 μm and less than or equal to 1.2 μm accounts for more than 80% of the total number of the grain boundaries having a length greater than or equal to 0.1 μm.

In some embodiments of the present disclosure, preferably, a grain boundary density of the secondary particles is greater than or equal to 1.8, for example, the grain boundary density of the secondary particles is 1.8, 2, 2.2, 2.5, 2.8, 3, or any value within a range defined by any two of these values, and preferably, 2 to 3. The grain boundary density is a ratio of the number of interfaces, on the cross-section of the secondary particles, between the primary particles to the number of the primary particles on the cross-section of the secondary particle.

In the present disclosure, when the length and the proportion of the grain boundaries, as well as the grain boundary density fall within the above protection range, especially the preferred protection range, the primary particles in the multi-electrode cathode material exhibit an obvious disordered distribution without causing cracking of the positive electrode active material particles due to charging and discharging, thereby maintaining sufficient cycle characteristics.

In some embodiments of the present disclosure, preferably, an average aspect ratio of the primary particles is less than or equal to 1.5, for example, the average aspect ratio of the primary particles is 0.8, 0.9, 1, 1.02, 1.05, 1.08, 1.1, 1.3, 1.5, or any value within a range defined by any two of these values, preferably, ranging from 1 to 1.5, and more preferably, ranging from 1 to 1.1. When the above conditions are met, the primary particles have a smaller average aspect ratio, facilitating their mutual stacking, thereby increasing a packing density of the primary particles among the secondary particles.

In the present disclosure, the aspect ratio has the same concept as a length-to-width ratio, that is, a ratio of the longest diameter through the interior of the particle to a longest diameter perpendicular thereto. This parameter is used to describe the morphology of the particle and to determine whether its shape is close to a regular form. The average aspect ratio in the present disclosure refers to an average of the aspect ratios of all the primary particles on the cross-section of the secondary particles.

In some embodiments of the present disclosure, more preferably, a proportion of the primary particles with an aspect ratio ranging from 0.9 to 1.1 is greater than or equal to 70%. When the above conditions are met, the primary particles are not easily guided to be radially arranged when agglomerated into the secondary particles, they can easily change their packing form under the pressure, causing the secondary particles to undergo deformation without fracture.

In some embodiments of the present disclosure, preferably, an average particle size $DB_{50}$ of the secondary particles and an average particle size $DA_{50}$ of the primary particles satisfy: $10 \leq DB_{50}/DA_{50} \leq 40$, for example, $DB_{50}/DA_{50}$ is 10, 15, 20, 25, 30, 35, 40, or any value within a range defined by any two of these values. In the present disclosure, when $DA_{50}$ and $DB_{50}$ satisfy the above formula, the secondary particles are composed of an appropriate amount of the primary particles, and are tightly bound to each other, which is conducive to increasing the strength of the secondary particles; and meanwhile, it maintains better electrical properties.

In the present disclosure, the secondary particles are spherical or nearly spherical. Preferably, the average particle size $DB_{50}$ of the secondary particles ranges from 6 μm to 14 μm, for example, the average particle size $DB_{50}$ of the secondary particles is 6 μm, 8 μm, 10 μm, 12 μm, 14 μm, or any value within a range defined by any two of these values, and preferably, from 8 μm to 12 μm.

In some embodiments of the present disclosure, preferably, the average particle size $DA_{50}$ of the primary particles ranges from 0.1 μm to 1.5 μm, for example, the average particle size $DA_{50}$ of the primary particles is 0.1 μm, 0.2 μm, 0.5 μm, 0.8 μm, 1 μm, 1.2 μm, 1.5 μm, or any value within a range defined by any two of these values, and preferably, from 0.2 μm to 1.2 μm. When the average particle size $DA_{50}$ of the primary particles satisfies the above range, the primary particles in the multi-electrode cathode material have a smaller average particle size and denser packing, which is conducive to forming a stable structure, alleviating internal stress during a battery charging and discharging process, and slowing down the generation of microcracks.

In some embodiments of the present disclosure, preferably, the multi-element cathode material has a composition represented by Formula I: $Li_a(Ni_xCo_yMn_zM_b)G_cO_2$ (I); where $1 \leq a \leq 1.2$, $0 \leq b \leq 0.05$, $0 \leq c \leq 0.05$, $0.3 \leq x < 1$, $0 < y < 0.5$, $0 < z < 0.5$, and $x+y+z+b=1$; and M and G are each independently selected from at least one element of Mg, Ti, W, V, Ta, Zr, La, Ce, Er, Sr, Si, B, Al, Co, and Y.

In some embodiments of the present disclosure, more preferably, in Formula I, $1 \leq a \leq 1.1$, $0 < b \leq 0.02$, $0 < c \leq 0.02$, $0.4 \leq x \leq 0.95$, $0.01 \leq y \leq 0.2$, and $0.01 \leq z \leq 0.3$; M is selected from at least one element of Mg, Ti, W, V, Ta, Zr, La, Ce, Er, Sr, Si, Al, Co, and Y; and G is selected from at least one element of Mg, Ti, W, Zr, Ce, Er, Si, B, and Al.

In some embodiments of the present disclosure, more preferably, in Formula I, $0.0001 \leq b \leq 0.02$, $0.0001 \leq c \leq 0.02$, M is selected from at least one element of W, Zr, La, and Y; and G is selected from at least one element of B, Ti, W, Si, and Al.

In some embodiments of the present disclosure, preferably, in an X-ray diffraction, XRD, pattern, a full width at half maximum $FWHM_{(104)}$ of a characteristic diffraction peak of the multi-element cathode material on a (104) crystal plane ranges from 0.2 to 0.24, for example, the $FWHM_{(104)}$ of the characteristic diffraction peak of the multi-element cathode material at the (104) crystal plane is 0.2, 0.22, 0.23, 0.24, or any value within a range defined by any two of these values, and preferably, from 0.22 to 0.24.

In the present disclosure, on the one hand, when the $FWHM_{(104)}$ of the characteristic diffraction peak of the (104) crystal plane meets the above conditions, the multi-electrode positive material has better crystallinity and cycle performance. Meanwhile, the crystal grains can be fully developed, resulting in a higher number of grain boundaries in the primary particles. Since the crystal arrangement at the grain boundaries is highly irregular, with crystal planes interlaced like canine teeth and interlocked with each other, the multi-electrode positive material can have a stable structure under a normal pressure. Meanwhile, due to relatively low strength at the grain boundaries, the secondary particles are prone to creep under the high pressure, thereby reducing extrusion of aluminum foil plates by secondary spheres and reducing the fracture of the plates. On the other hand, when the $FWHM_{(104)}$ of the characteristic diffraction peak of the (104) crystal plane meets the above conditions, there is less adhesion between the secondary particles, which can increase the pallet density of the multi-electrode cathode material and further reduce the occurrence of the fracture of positive electrode plates.

In some embodiments of the present disclosure, preferably, the multi-element cathode material has a single-layered $\alpha$-$NaFeO_2$ type structure.

In some embodiments of the present disclosure, preferably, a powder pallet density of the multi-component cathode material is greater than or equal to 3.4 $g/cm^3$. The multi-component cathode material according to the present disclosure has a relatively high powder pallet density, thereby increasing an energy density of a lithium battery to a certain extent.

In some embodiments of the present disclosure, preferably, a total residual alkali content of the multi-electrode cathode material satisfies: $m(Li_2CO_3)+m(LiOH)<6000$ ppm; more preferably, the total residual alkali content of the multi-electrode material also satisfies: $m(Li_2CO_3)+m(LiOH)<6000$ ppm, and both $m(Li_2CO_3)$ and m(LiOH) are below 3000 ppm.

In the present disclosure, when the total residual alkali content of the multi-electrode cathode material meets the above conditions, the obtained multi-electrode cathode material has a stable and intact lattice structure, which can significantly enhance structural stability, rate capacity, and safety performance of the cathode material, thereby further improving cycle stability of the multi-electrode cathode material. Meanwhile, the reduction in the amount of residual alkali can also reduce the adhesion between the particles, increase the pallet density of the material, and further reduce the occurrence of the fracture of the plates.

A second aspect of the present disclosure provides a method for preparing a multi-element cathode material. The method includes:

- step 1 of mixing a precursor having a composition represented by formula (II) with a lithium source to obtain a mixture I, the precursor being agglomerated by primary crystal grains, and the primary crystal grains on a cross-section of the precursor being non-radially distributed;
- step 2 of performing a primary sintering on the mixture I in an oxygen-containing atmosphere to obtain an intermediate product, conditions for the primary sintering include: heating to a temperature Ti at a heating rate V1 and holding at the temperature T1 for a thermostatic duration t1; and then heating to a temperature T2 at a heating rate V2 and holding at the temperature T2 for a thermostatic duration t2;

step 3 of mixing the intermediate product with a coating agent optionally containing G to obtain a mixture II; and step 4 of performing a secondary sintering on the intermediate product or the mixture II in an oxygen-containing atmosphere to obtain the multi-element cathode material, wherein $(Ni_{\alpha}Co_{\beta}Mn_{\gamma}M_{\delta})(OH)_2$ (II), where $0.3\leq\alpha<1$, $0<\beta<0.5$, $0<\gamma<0.5$, $0\leq\delta\leq0.05$, and $\alpha+\beta+\gamma+\delta=1$; and M and G are each independently selected from at least one element of Mg, Ti, W, V, Ta, Zr, La, Ce, Er, Sr, Si, B, Al, Co, and Y.

In some embodiments of the present disclosure, preferably, in Formula II, $0.4\leq\alpha\leq0.95$, $0.01\leq\beta\leq0.2$, $0.01\leq\gamma\leq0.3$, $0<\delta\leq0.02$, and $\alpha+\beta+\gamma+\delta=1$, and M is selected from at least one element of Mg, Ti, W, V, Ta, Zr, La, Ce, Er, Sr, Si, Al, Co, and Y; and more preferably, in Formula II, $0.0001\leq\delta\leq0.02$, and M is selected from at least one element of W, Zr, La, and Y.

The inventors of the present disclosure have found through research that when the specific doping element M is added to the cathode material, it facilitates a disordered distribution of the primary particles. Moreover, the doping element M will be distributed at the interface in an amorphous state. When being squeezed, the doping element M can serve as a lubricant, so that the secondary particles are less likely to fracture, and only have a relative displacement, thus slowing down the occurrence of the fracture of the plate while ensuring that electrical properties of the material are not affected. Compared with adding the dopant containing the element M during the compounding of the mixture, adding the dopant containing the element M during a wet coprecipitation synthesis process of the precursor can, on the one hand, stabilize an internal structure of the material and improve a cycle life of a ternary material, especially a high-nickel ternary material. On the other hand, the doping element M can be more evenly distributed in the cathode material, which is conducive to the disordered distribution of the primary particles.

Meanwhile, the present disclosure also optimizes the sintering process, specifically, a one-step sintering process with two-stage heat preservation is adopted for the lithium source and the precursor, allowing the lithium source to slowly and fully react with the precursor to obtain the intermediate product. The obtained intermediate product is then coated to finally obtain the multi-element cathode material with fully grown and randomly arranged crystal grains.

In some embodiments of the present disclosure, preferably, a $D_{50}$ of the precursor ranges from 8 μm to 14 μm, and a specific surface area of the precursor ranges from 3 $m^2/g$ to 7 $m^2/g$.

In some embodiments of the present disclosure, preferably, the amounts of the precursor and the lithium source satisfy: n(Ni+Co+Mn+M):n(Li)=1:1 to 1.2, and preferably, n(Ni+Co+Mn+M):n(Li)=1:1 to 1.1.

In some embodiments of the present disclosure, preferably, the precursor is prepared by contacting, in an inert atmosphere, a mixed metallic salt solution containing a nickel source, a cobalt source, a manganese source, and an optional dopant containing M with a precipitant, a complexing agent, and a dispersant for a coprecipitation reaction to obtain a coprecipitation reaction product, and sequentially performing washing and drying on the obtained coprecipitation reaction product to obtain the precursor.

In the present disclosure, unless otherwise specified, the inert atmosphere includes but is not limited to a nitrogen atmosphere, an argon atmosphere, etc.

In some embodiments of the present disclosure, preferably, conditions for the coprecipitation reaction include: a temperature ranging from 40° C. to 80° C., a pH value ranging from 10 to 13, and a stirring speed ranging from 200 rpm to 550 rpm. More preferably, the conditions for the coprecipitation reaction include: the temperature ranging from 50° C. to 70° C., the pH value is ranging from 11 to 12.5, and the stirring speed ranging from 350 rpm to 500 rpm.

In the present disclosure, by controlling the conditions for the coprecipitation reaction, especially by adding the doping element M, and keeping the pH value and the stirring speed within the specified range, the disordered growth of seed crystals can be maintained, enabling the primary crystal grains to be distributed non-radially and disorderedly, and the precursor with disorderedly distributed internal crystal grains can be obtained.

In some embodiments of the present disclosure, preferably, in the mixed metal salt solution, the amounts of the nickel source, the cobalt source, the manganese source, and dopant satisfy: n(Ni):n(Co):n(Mn):n(M), $0.3\leq n(Ni)<1$, $0<n(Co)<0.5$, $0<n(Mn)<0.5$, and $0\leq n(M)\leq0.05$; more preferably, $0.4\leq n(Ni)\leq0.95$, $0.01\leq n(Co)\leq0.2$, $0.01\leq n(Mn)\leq0.3$, and $0<n(M)\leq0.02$; more preferably, $0.0001\leq n(M)\leq0.02$.

In some embodiments of the present disclosure, preferably, in terms of metallic elements, a concentration of the mixed metallic salt solution ranges from 1 mol/L to 3 mol/L.

In some embodiments of the present disclosure, preferably, the nickel source, the cobalt source, the manganese source, and the dopant are each independently selected from at least one of sulfate, chlorate, nitrate, and acetate. In the present disclosure, the nickel source is selected from at least one of nickel sulfate, nickel chlorate, nickel nitrate, and nickel acetate; the cobalt source is selected from at least one of cobalt sulfate, cobalt chlorate, cobalt nitrate, and cobalt acetate; and the manganese source is selected from at least one of manganese sulfate, manganese chlorate, manganese nitrate, and manganese acetate.

In some embodiments of the present disclosure, preferably, the dopant is selected from soluble salts containing M, preferably selected from at least one of sulfates, chlorides, hydroxide, and carbonate containing M.

In a specific embodiment of the present disclosure, the dopant is selected from at least one of sulfates, chlorides, hydroxide, and carbonate containing Mg, Ti, W, V, Ta, Zr, La, Ce, Er, Sr, Si, B, Al, Co, and Y, preferably, from at least one of sulfates, chlorides, hydroxide, and carbonate containing Mg, Ti, W, V, Ta, Zr, La, Ce, Er, Sr, Si, Al, Co, and Y, and more preferably, from at least one of sulfates, chlorides, hydroxide, and carbonate containing W, Zr, La, and Y.

In a specific embodiment of the present disclosure, the precipitant is selected from NaOH and/or KOH; the complexing agent is selected from at least one of aqueous ammonia, disodium ethylenediaminetetraacetate, ammonium nitrate, ammonium chloride, and ammonium sulfate; and the dispersant is selected from at least one of polyethylene glycol (PEG), polyvinyl alcohol (PVA), and polyglycerol.

In a specific embodiment of the present disclosure, the precipitant, the complexing agent, and the dispersant each independently exist in a form of an aqueous solution; more preferably, a concentration of a precipitant solution ranges from 2 mol/L to 15 mol/L; a concentration of a complexing agent solution ranges from 1 mol/L to 15 mol/L; and a concentration of a dispersant solution ranges from 1 g/L to 200 g/L.

In the present disclosure, the washing is intended to remove substances remaining on a surface of the coprecipitation reaction product; and the drying is intended to remove moisture remaining on the surface of the coprecipitation reaction product, etc. Preferably, a drying temperature ranges from 105° C. to 130° C.

In some embodiments of the present disclosure, preferably, in step (2), the conditions for the primary sintering include: the heating rate V1 ranging from 1° C./min to 6° C./min, preferably, from 1° C./min to 3° C./min, and more preferably, from 1° C./min to 2° C./min; the temperature T1 ranging from 400° C. to 760° C., and preferably, from 500° C. to 750° C.; and the thermostatic duration t1 ranging from 2 hours to 6 hours, and preferably, from 3 hours to 5 hours; and the heating rate V2 ranging from 1° C./min to 6° C./min, and preferably, from 1° C./min to 3° C./min; the temperature T2 ranging from 710° C. to 950° C., and preferably, from 710° C. to 920° C.; and the thermostatic duration t2 ranging from 5 hours to 13 hours, and preferably, from 6 hours to 12 hours.

In the present disclosure, the two-stage platform sintering process is adopted to prepare the multi-element cathode material, which endows the multi-element cathode material with advantages of low residual alkali, disordered internal structure, stable structure, etc. That is, in step (2), by setting suitable heating rate (i.e., V1 and V2), thermostatic temperature (i.e., T1 and T2) and thermostatic duration (t1 and t2), the material is subjected to the sintering treatment on the two platforms, enabling the lithium source to fully react with the precursor and the primary particles to grow along various crystal directions after the growth, thereby obtaining a pressure-resistant agglomerated cathode material with a disordered internal structure orientation.

In some preferred embodiments of the present disclosure, preferably, in terms of metallic elements, an oxygen concentration in the oxygen-containing atmosphere is greater than or equal to 92% by volume when a nickel content in the precursor is greater than or equal to 60 mol %. With such setting, the sufficient oxygen concentration ensures that a degree of a mixed arrangement of nickel ions and lithium ions is reduced when the nickel content is high, thereby reducing the residual alkali content of the material.

In some embodiments of the present disclosure, preferably, a product of the primary sintering is cooled to room temperature and then crushed to obtain the intermediate product. In the present disclosure, the crushing includes but is not limited to at least one of jaw crushing, roll crushing, colloid milling, mechanical milling, and jet milling.

In some embodiments of the present disclosure, preferably, in step (3), amounts of the intermediate product and the coating agent satisfy n(Ni+Co+Mn+M):n(G)=1:n(G), where 0≤n(G)≤0.05, preferably, 0<n(G)≤0.02, and more preferably, 0.0001≤n(G)≤0.02.

In some embodiments of the present disclosure, preferably, the coating agent is selected from at least one of oxide, hydroxide and carbonate containing G, preferably selected from at least one of oxide, hydroxide, and carbonate containing Mg, Ti, W, Zr, Ce, Er, Si, B, and Al, and more preferably, from at least one of oxide, hydroxide, and carbonate containing B, Ti, W, Si, and Al.

In some embodiments of the present disclosure, preferably, in step (4), conditions for the secondary sintering include: a temperature T3 ranging from 300° C. to 800° C., and preferably, from 400° C. to 700° C.; and a duration t3 ranging from 4 hours to 10 hours, and preferably, from 5 hours to 8 hours.

In the present disclosure, the multi-element cathode material prepared according to the above method has a composition represent ed by formula I: $Li_a(Ni_xCo_yMn_zM_b)G_cO_2$ (I); where 1≤a≤1.2, 0≤b≤0.05, 0≤c≤0.05, 0.3≤x<1, 0<y<0.5, 0<z<0.5, and x+y+z+b=1; and M and G are each independently selected from at least one element of Mg, Ti, W, V, Ta, Zr, La, Ce, Er, Sr, Si, B, Al, Co, and Y.

In some embodiments of the present disclosure, preferably, in Formula I, 1≤a≤1.1, 0<b≤0.02, 0<c≤0.02, 0.4≤x≤0.95, 0.01≤y≤0.2, and 0.01≤z≤0.3; M is selected from at least one element of Mg, Ti, W, V, Ta, Zr, La, Ce, Er, Sr, Si, Al, Co, and Y; and G is selected from at least one element of Mg, Ti, W, Zr, Ce, Er, Si, B, and Al.

In some embodiments of the present disclosure, more preferably, in Formula I, 0.0001≤b≤0.02, 0.0001≤c≤0.02, M is selected from at least one element of W, Zr, La, and Y; and G is selected from at least one element of B, Ti, W, Si, and Al.

A third aspect of the present disclosure provides a positive electrode plate. An active material layer of the positive electrode plate includes the multi-element cathode material according to the first aspect of the present disclosure or the multi-element cathode material prepared by the method according to the second aspect of the present disclosure.

In the present disclosure, unless otherwise specified, the positive electrode plate includes a positive electrode current collector and an active material layer loaded on the positive electrode current collector.

In some embodiments of the present disclosure, the active material layer includes not only the multi-element cathode material but also a conductive agent, a binder, and a dispersant.

In a specific embodiment of the present disclosure, the positive electrode plate was prepared by the following method: the above-mentioned multi-electrode positive material, SuperP, CNT, and polyvinylidene fluoride (PVDF) were fully mixed in a mass ratio of 97:1:0.8:1.2 with an appropriate amount of N-methylpyrrolidone (NMP) to form a uniform slurry, and the uniform slurry was coated on an aluminum foil. After the drying process, the coated aluminum foil was punched into plates of 112 mm×40 mm by using a die-cutting machine. The loading amount of the multi-electrode positive material is 380±2 $g/m^2$.

A method for determining the fragmentation of the electrode plate in the present disclosure was as follows. The prepared positive electrode plates were all baked in a vacuum oven at a temperature of 125° C. for more than 8 hours; then, the positive electrode plates were tested by rolling twice to reach a corresponding pallet density; then, the plates were folded by pressing with a flat plate of a fixed weight; finally, the plates were observed for light transmission by using a LED point light source. Meanwhile, the thicknesses and lengths of the positive electrode plates before and after the rolling were recorded, and the thickness compression ratios and elongations of the positive electrode plates before and after the rolling were calculated. The positive electrode plates were pressed to the different pallet densities, and light transmission of the positive electrode plates was observed and statistically analyzed when the plates were folded once, twice, three times, and four times at different pallet densities. The result of the fragmentation of the plate was determined based on whether the plates were light-transmitting.

In the present disclosure, in addition to the above method for determining the fracture of the plate, the above multi-element cathode material can also be prepared into a battery plate according to the same formulation. After applying a certain pressure to the plates, a cross-section of the battery plate was observed under SEM. The fragmentation of the plate was determined based on the condition of the cross-section.

In some embodiments of the present disclosure, preferably, an ultimate pallet density of the positive electrode plate ranges from 3.2 $g/cm^3$ to 3.8 $g/cm^3$, for example, the ultimate pallet density of the positive electrode plate is 3.2 $g/cm^3$, 3.3 $g/cm^3$, 3.5 $g/cm^3$, 3.6 $g/cm^3$, 3.7 $g/cm^3$, 3.8 $g/cm^3$, or any value within a range defined by any two of these values, and preferably, from 3.3 to 3.7 $g/cm^3$.

In some embodiments of the present disclosure, preferably, a thickness compression ratio of the positive electrode plate ranges from 25% to 45%, for example, the thickness compression ratio of the positive electrode plate is 25%, 30%, 32%, 35%, 38%, 40%, 45%, or any value within a range defined by any two of these values, and preferably, 30% to 40%.

In some embodiments of the present disclosure, preferably, an elongation of the positive electrode plate ranges from 1.2% to 3%, for example, the elongation of the positive electrode plate is 1.2%, 1.5%, 1.8%, 2%, 2.2%, 2.5%, 3%, or any value within a range defined by any two of these values, and preferably, from 1.5% to 2.5%.

In the present disclosure, the positive electrode plate prepared by the above multi-element cathode material can withstand a larger rolling pressure and is not prone to fracture.

A fourth aspect of the present disclosure provides a lithium-ion battery. The lithium-ion battery includes the positive electrode plate prepared according to the third aspect of the present disclosure.

The present disclosure has the following advantages compared with the prior arts.

(1) The multi-electrode material according to the present disclosure has a ratio of the total cross-sectional area of the primary particles with more than 5 grain boundaries to the cross-sectional area of the secondary particles is greater than or equal to 3:4, the grain boundary herein satisfies that the length thereof is greater than or equal to 0.1 μm, and the porosity on the cross-section of the secondary particles is less than or equal to 2%. Therefore, most of the primary particles constituting the secondary particles are closely arranged and have a large number of the grain boundaries. It can also be understood that most of the cross-sections of the primary particles of the present disclosure on the cross-section of the secondary particles are polyhedral. Based on the close arrangement characteristic of the primary particles with the polyhedral cross-sections, the multi-element cathode material according to the present disclosure can disperse and conduct the applied pressure along the multi-directional interfaces under ultimate compaction, that is, the internal primary particles will undergo creep under the pressure and are not likely to fracture. When the multi-element cathode material with such structure is applied in the positive electrode plate, the fracture of the plate can be reduced, endowing the multi-element cathode material with a higher powder pallet density and improved processability.

(2) The method according to the present disclosure adopts the precursor with the disordered internal crystal grains, and the multi-element cathode material with the disordered internal crystal grains is prepared by optimizing the primary sintering process. Specifically, by controlling the conditions for the coprecipitation reaction to maintain the disordered growth of seed crystals, and resulting in non-radial and disordered distribution of primary crystal grains, the precursor that meets the requirements are prepared. After the above precursor is fully mixed with the lithium source, the lithium source is slowly and fully reacted with the precursor through a double-platform heat preservation sintering process curve to obtain the intermediate product, and the obtained intermediate product is then coated. Finally, the multi-element cathode material with fully grown and disordered crystal grains is obtained.

(3) The multi-element cathode material according to the present disclosure is applied in the positive electrode plate. When the specific doping element M is contained, the doping element M will be distributed at the interface in an amorphous state. When being pressed, the specific doping element M can serve as a lubricant, so that the secondary particles are less likely to fracture, and only have a relative displacement, thus slowing down the occurrence of the fracture of the plate while ensuring that electrical properties of the material are not affected, enabling the material to easily withstand the higher rolling pressure and the electrode plate is less prone to fracture.

The present disclosure will be described in detail below through examples.

(1) Compositions of both the precursor and the multi-element cathode material were measured through Inductively Coupled Plasma (ICP); an instrument used was PE Optima 7000DV, and test conditions included: a sample of 0.1 g was completely dissolved in a mixed acid solution of 3 mL $HNO_3$+9 mL HCl, and the mixture was diluted to 250 mL for testing;

(2) Obtaining the cross-section of the secondary particles: in the present disclosure, there are two methods for obtaining the cross-section of the secondary particles. That is, the first method was represented as SEM images of cross-sections as illustrated in FIGS. 1 to 4, the cross-section of the secondary particles was obtained as follows: a small amount of a to-be-tested material was taken and placed on a microscope slide; and then the material was squeezed by using another microscope slide; a cross-section obtained by squeezing from the spherical center of the secondary particle was selected, and the cross-section was observed under a scanning electron microscope to obtain the cross-section of the secondary particles of the present disclosure. This method was convenient for a stereoscopic observation.

Figure 1:
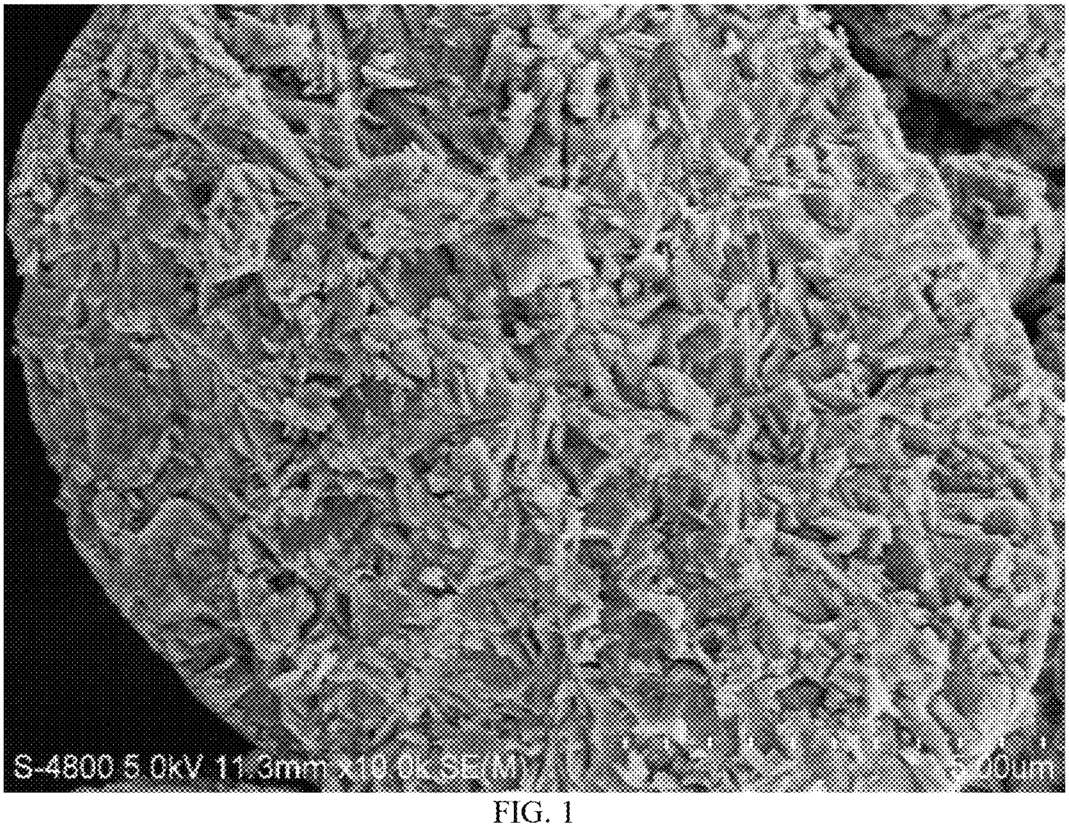
FIG. 1 is a Scanning Electron Microscope, SEM, image of a cross-section of a precursor S1 prepared in Example 1.
Figure 2:
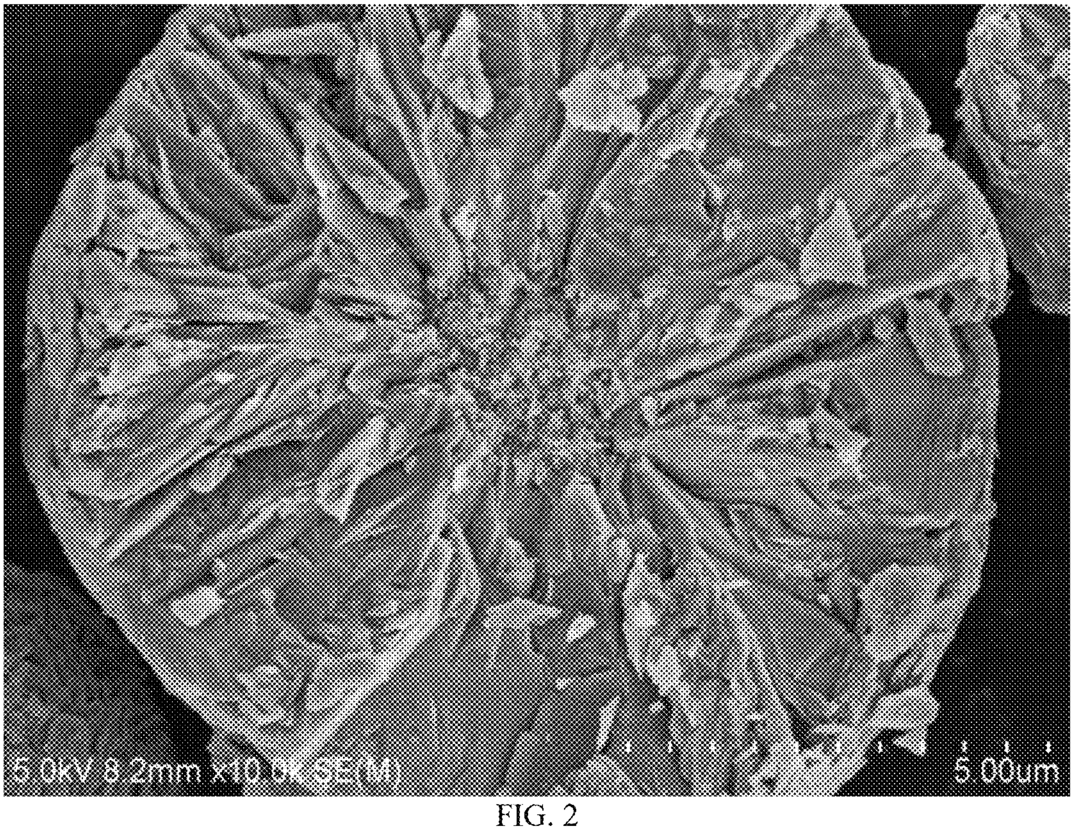
FIG. 2 is an SEM image of a cross-section of a precursor DS1 prepared in Comparative Example 1.
Figure 3:
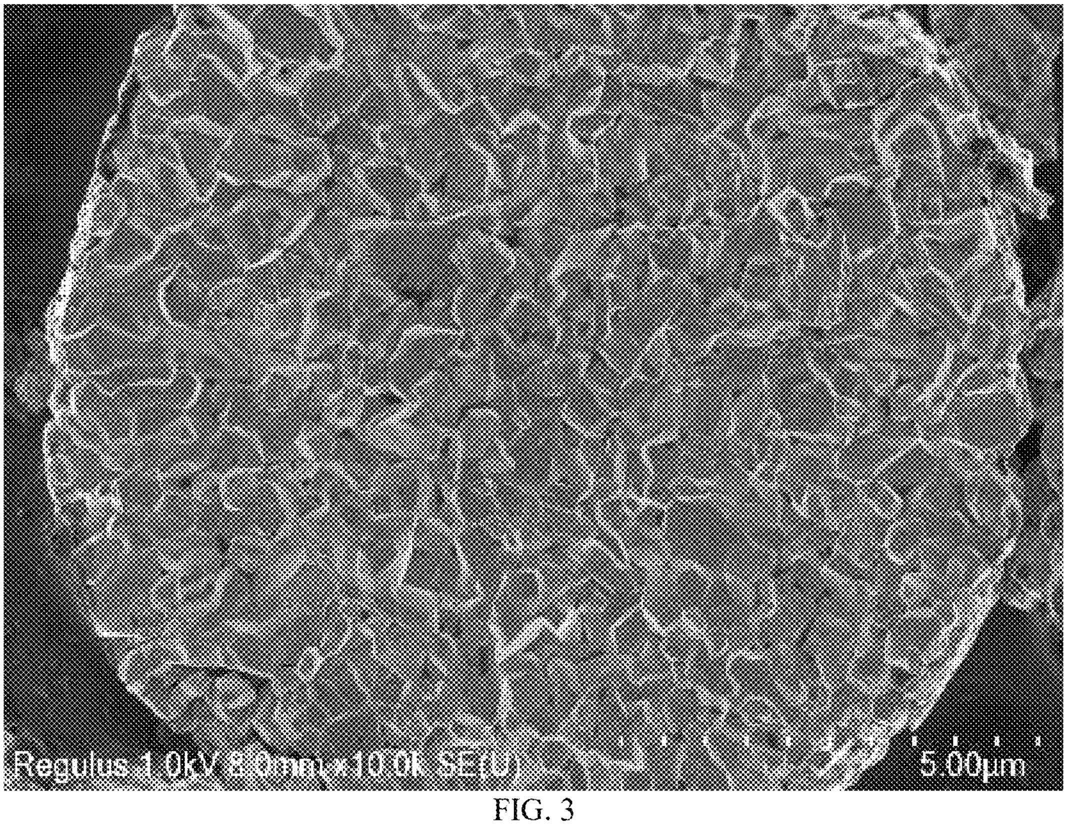
FIG. 3 is an SEM image of a cross-section of a multi-element cathode material P3 prepared in Example 3.
Figure 4:
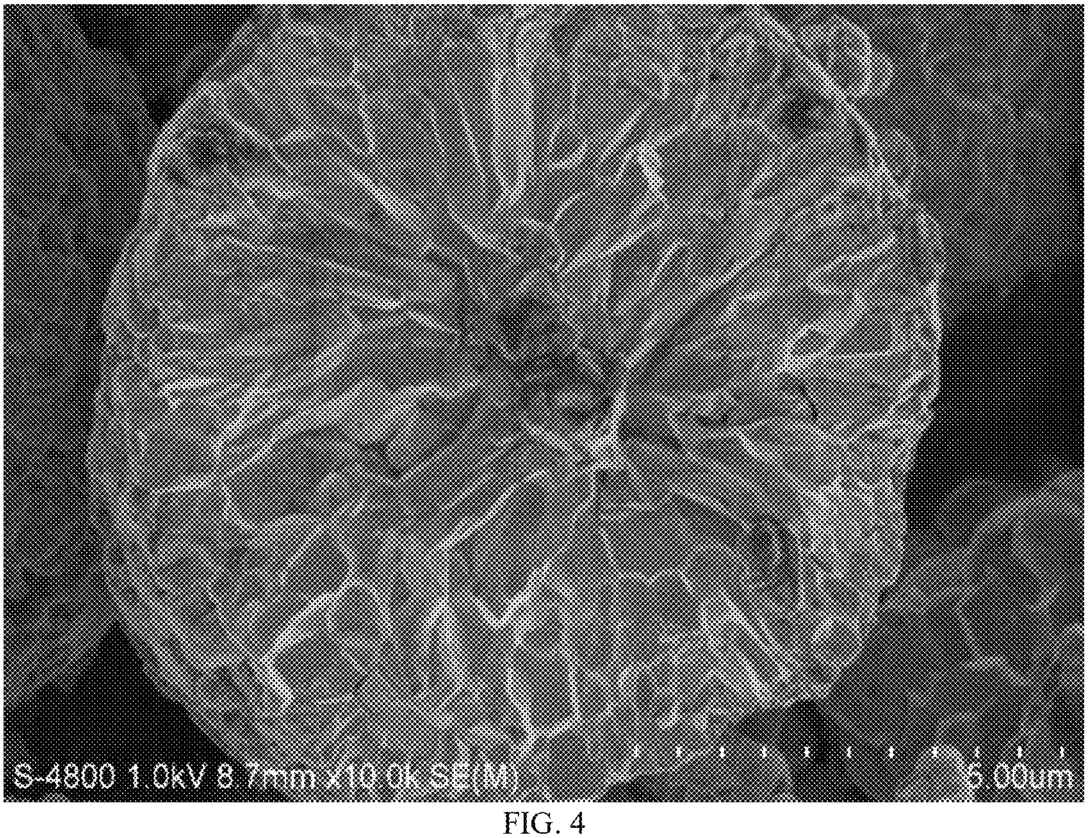
FIG. 4 is an SEM image of a cross-section of a multi-element cathode material DP3 prepared in Comparative Example 3.
Figure 5:
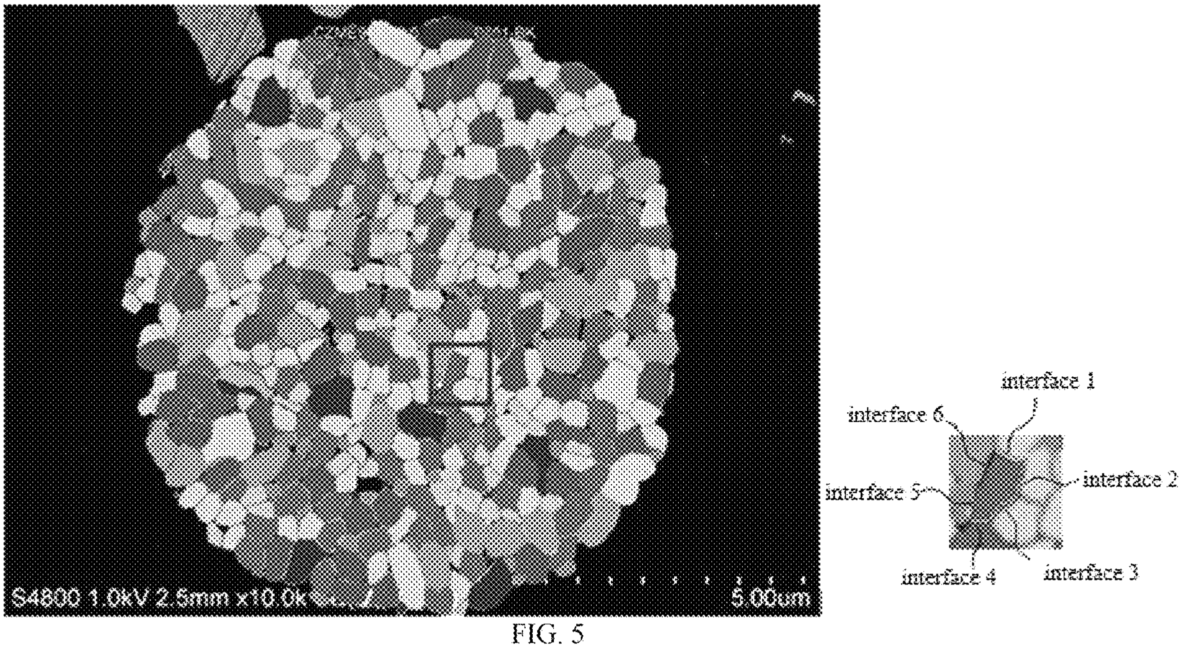
FIG. 5 is an image of an ion-milled cross-section of the secondary particle of a multi-element cathode material P4 prepared in Example 4; in the magnified view of the boxed area (right), one of the primary particles having 6 grain boundaries is shown.

The second method was represented as images of cross-sections as illustrated in FIGS. 5 to 6, the cross-section obtained by this method is convenient for clearly defining the grain boundaries mentioned in the present disclosure. The cross-section of the secondary particles was obtained as follows.

S1, sample preparation: a, an aluminum foil of about 2×4 $cm^2$ and a silicon wafer of 1.5×1.5 $cm^2$ were cut for later use. The aluminum foil was folded in half, two edges thereof were flattened, and a gap was reserved in a middle part thereof for placing the sample. b, a conductive adhesive was added to cathode material powder, and mixed evenly. Then, the mixed material was picked and placed in the reserved gap of the aforementioned aluminum foil. Next, the aluminum foil was placed on a platform. First, the periphery of the sample was compacted with a flat plate, and then, the sample in the middle part was gently pressed to obtain a pre-treated sample. The surface of the pre-treated sample that was in contact with the platform was marked as a front side and the pressed surface thereof was marked as a back side. c, the pre-treated sample was dried at a temperature of 100° C. for 60 minutes. After the drying, the pre-treated sample was taken out, and an excess part of the aluminum foil without the sample on the pre-treated sample was cut off. Then, the sample was cut vertically from the back side where the sample is sufficient. d, the above silicon wafer was taken and a glue was used to stick the back side of the cut pre-treated sample on the silicon wafer. In this way, the relatively flat front side of the sample can be closely attached to a baffle and face an ion beam directly. During the attachment, it should be ensured that the cut surface of the aluminum foil protruded beyond an edge of the silicon wafer, for example, by more than 60 μm, or was flush with it, to obtain a to-be-tested sample.

S2, measurement: a conductive tape was stuck on a side edge of a sample stage and the to-be-tested sample was fixed on the sample stage. An upper edge of the to-be-tested sample should be located at a higher level of about 1 mm to 3 mm than the sample stage. Then, the to-be-tested sample on the sample stage was subjected to an ion milling treatment. After the milling was completed, a liquid conductive adhesive was applied in the gap between the silicon wafer and the sample in the to-be-tested sample to increase conductivity. Finally, the treated sample stage was placed on a sample stage support dedicated for an electron microscope, and a position of the sample stage was tightly secured with an Allen wrench, to obtain a cross-section sample through observation by the electron microscope. An ion milling instrument used in the present disclosure was Hitachi Ion Milling Instrument System IM4000PLUS. Reference can be made to Table 1 for ion milling conditions:

TABLE 1

| Test items | Sample mass, g | Amount of liquid conductive adhesive, g | Acceleration voltage, kV | Deflection angle, ° | Operation duration, min |
|---|---|---|---|---|---|
| Precursor | 0.04 | 0.02(1 drop) | 6 | C4 ± 30 | 40 |
| Aggregates | 0.04 | 0.02(1 drop) | 6 | C4 ± 30 | 40 |
| Single crystal | 0.06 | 0.04(2 drops) | 6 | C4 ± 30 | 40 |
| Half-cell electrode plate | — | — | 6 | C6 ± 40 | 25 |
| Full-cell electrode plate | — | — | 6 | C6 ± 40 | 35 |

Based on an ion-milled cross-sectional image obtained by the above method, it is necessary to screen out the particles with a cross-sectional diameter ranging from 8 μm to 12 μm for observation according to the average particle size of secondary particles defined by the present disclosure, because the cross-section within this diameter range passed through or was close to the center of the sphere, making it more representative. During the ion milling, STAGE CONT of the ion milling instrument should first be set to C4 mode, the operation duration should be adjusted to 40 minutes, the acceleration voltage should be 6 kV, a discharge voltage should be adjusted to its maximum value, and the airflow should be adjusted to 0.09 $cm^3$/min. The test conditions for the electron microscope were as follows: low-voltage back-scatter mode was adopted, with a voltage of 1 kV, a WD of 2.5 mm, and magnification of 10,000×.

(3) Measurement standard for grain boundary: in the present disclosure, the grain boundary was determined based on an ion-milled cross-sectional view and defined as the interface between the primary particles with the same structure but the different orientations on the cross-section of the secondary particles, and a length of the interface is greater than or equal to 0.1 μm.

(4) Morphology test: it was obtained through the test by using a scanning electron microscope of model 5-4800 produced by Hitachi, Ltd. of Japan.

(5) Particle sizes $DA_{50}$ and $DB_{50}$: they were obtained through the test by using a laser particle size analyzer of model Mastersize2000 produced by Malvern Company.

(6) Pallet density: it was obtained through the test by using a tapped density tester of model BT-30 produced by Baxter Company.

Compositions and physical property parameters of the precursors prepared in Preparation Examples 1 to 5 and Comparative Preparation Examples 1 to 4 are all listed in Table 2.

Preparation Example 1

2 mol/L mixed metal salt solution was prepared, calculated in terms of metal elements, the molar ratio of nickel sulfate, cobalt sulfate, manganese sulfate, and yttrium sulfate was 0.5:0.2:0.2985:0.0015, respectively; 3 mol/L NaOH solution, a 3 mol/L ammonia solution, and 10 g/L PVA dispersant aqueous solution were prepared; under a nitrogen protection atmosphere, the above solutions were introduced into a reaction kettle in a parallel-flow manner for a coprecipitation reaction, and the reaction temperature was 50° C., a reaction pH value was 11.2, a stirring speed was 350 rpm. After washing, drying at 120° C., and sieving, the precursor S1 was obtained. The SEM of a cross-section of the precursor S1 was shown in FIG. 1. It can be seen from FIG. 1 that the precursor S1 was agglomerated by primary crystal grains, and the primary crystal grains on the cross-section of the precursor S1 were randomly distributed.

Preparation Example 2

Preparation Example 2 was carried out according to the method of Preparation Example 1, with the following differences: the dopant was replaced with zirconium chloride; 2 mol/L mixed metal salt solution was prepared, calculated in terms of metal elements, the molar ratio of nickel sulfate, cobalt sulfate, manganese sulfate, and zirconium chloride was 0.6:0.2:0.1985:0.0015, respectively; the stirring speed was changed to 450 rpm, and the dispersant was replaced with a 10 g/L PEG1000 dispersant aqueous solution. The other conditions were the same as those in Preparation Example 1. The precursor S2 was obtained. The SEM image of a cross-section of the above precursor S2 is similar to that in FIG. 1.

Preparation Example 3

Preparation Example 3 was carried out according to the method of Preparation Example 1, with the following differences: the dopant was replaced with lanthanum nitrate; 2 mol/L mixed metal salt solution was prepared, calculated in terms of metal elements, the molar ratio of nickel sulfate, cobalt sulfate, manganese sulfate, and lanthanum nitrate was 0.81:0.09:0.0985:0.0015; the concentration of the aqueous ammonia was replaced with 4 mol/L; the conditions for the coprecipitation reaction were replaced with the reaction temperature of 55° C., the reaction pH value of 11.7, and the stirring speed of 450 rpm. The other conditions were the same as those in Preparation Example 1. The precursor S3 was obtained. The SEM image of a cross-section of the above precursor S3 was similar to that in FIG. 1.

Preparation Example 4

Preparation Example 4 was carried out according to the method of Preparation Example 1, with the following differences: the dopants were replaced with sodium tungstate and yttrium sulfate; 2 mol/L mixed metal salt solution was prepared, calculated in terms of metal elements, the molar ratio of nickel sulfate, cobalt sulfate, manganese sulfate, sodium tungstate, and yttrium sulfate was 0.95:0.02:0.0275:0.001:0.0015; the concentration of NaOH was replaced with 4 mol/L; a 10 g/L PEG1000 dispersant aqueous solution was used as the dispersant; the reaction pH value of the coprecipitation reaction was replaced with 12.1, and the stirring speed was replaced with 400 rpm. The other conditions were the same as those in Preparation Example 1. The precursor S4 was obtained. The SEM image of a cross-section of the above precursor S4 was similar to that in FIG. 1.

Preparation Example 5

Preparation Example 5 was carried out according to the method of Preparation Example 4, with the following differences: no dopant (sodium tungstate and yttrium sulfate) was added; that is, 2 mol/L mixed metal salt solution was prepared, calculated in terms of metal elements, the molar ratio of nickel sulfate, cobalt sulfate, and manganese sulfate was 0.95:0.02:0.03. The other conditions were the same as those in Preparation Example 4. The precursor S5 was obtained. The SEM image of a cross-section of the above precursor S5 was similar to that in FIG. 1.

Comparative Preparation Example 1

Comparative Preparation Example 1 was carried out according to the method of Preparation Example 1, with the following differences: no dopant (yttrium sulfate) was added, that is, 2 mol/L mixed metal salt solution was prepared, calculated in terms of metal elements, the molar ratio of nickel sulfate, cobalt sulfate, and manganese sulfate was 50:20:30; the conditions for the coprecipitation reaction were replaced with the reaction temperature of 60° C., the reaction pH value of 11.7, and the stirring speed of 800 rpm. The other conditions were the same as those in Preparation Example 1. The precursor DS1 was obtained. The SEM image of a cross-section of the precursor DS1 was shown in FIG. 2. It can be seen from FIG. 2 that the precursor DS1 was agglomerated by the primary crystal grains, and the primary crystal grains on the cross-section of the precursor DS1 were radially distributed.

Comparative Preparation Example 2

Comparative Preparation Example 2 was carried out according to the method of Example 2, with the following differences: no dopant (zirconium chloride) was added; that is, 2 mol/L mixed metal salt solution was prepared, calculated in terms of metal elements, the molar ratio of nickel sulfate, cobalt sulfate, and manganese sulfate was 60:20:20; the concentration of the NaOH solution was 2 mol/L, and the concentration of the aqueous ammonia was 2 mol/L; the conditions for the coprecipitation reaction were replaced with the reaction temperature of 55° C., the reaction pH value of 13.2, and the stirring speed of 450 rpm. The other conditions were the same as those in Preparation Example 2. The precursor DS2 was obtained. The SEM image of a cross-section of the above precursor DS2 was similar to that in FIG. 2.

Comparative Preparation Example 3

Comparative Preparation Example 3 was carried out according to the method of Preparation Example 3, with the following differences: no dopant (lanthanum nitrate) was added; that is, 2 mol/L mixed metal salt solution was prepared, calculated in terms of metal elements, the molar ratio of nickel sulfate, cobalt sulfate, and manganese sulfate was 81:9:10; the conditions for the coprecipitation reaction were replaced with the reaction temperature of 58° C., the reaction pH value of 13.2, and the stirring speed of 800 rpm. The other conditions were the same as those in Preparation Example 3. The precursor DS3 was obtained. The SEM image of a cross-section of the above precursor DS3 was similar to that in FIG. 2.

Comparative Preparation Example 4

Comparative Preparation Example 4 was carried out according to the method of Preparation Example 4, with the following differences: no dopant (sodium tungstate and yttrium sulfate) was added; that is, 2 mol/L mixed metal salt solution was prepared, calculated in terms of metal elements, the molar ratio of nickel sulfate, cobalt sulfate, and manganese sulfate was 95:2:3; the dispersant was 10 g/L polyglycerol dispersant aqueous solution; the conditions for the coprecipitation reaction were replaced with the reaction temperature of 60° C., the reaction pH of 11.7, and the stirring speed of 600 rpm. The other conditions were the same as those in Preparation Example 4. The precursor DS4 was obtained. The SEM image of a cross-section of the above precursor DS4 was similar to that in FIG. 2.

TABLE 2

| | Preparation Example 1 | Preparation Example 2 | Preparation Example 3 | Preparation Example 4 | Preparation Example 5 |
|---|---|---|---|---|---|
| Precursor label | S1 | S2 | S3 | S4 | S5 |
| Doping element M | Y | Zr | La | W, Y | — |
| Precipitant, concentration/mol/L | NaOH, 3 | NaOH, 3 | NaOH, 3 | NaOH, 4 | NaOH, 4 |
| Complexing agent, concentration/mol/L | Aqueous ammonia, 3 | Aqueous ammonia, 3 | Aqueous ammonia, 4 | Aqueous ammonia, 3 | Aqueous ammonia, 3 |
| Dispersant, concentration g/L | PVA, 10 | PEG1000, 10 | PVA, 10 | PEG1000, 10 | PEG1000, 10 |

TABLE 2-continued

| | | | | | | |
|---|---|---|---|---|---|---|
| Coprecipitation reaction | Temperature, ° C. | 50 | 50 | 55 | 50 | 50 |
| | pH | 11.2 | 11.2 | 11.7 | 12.1 | 12.1 |
| | Speed, rpm | 350 | 450 | 450 | 400 | 400 |
| distributed* | | Disordered | Disordered | Disordered | Disordered | Disordered |

| | | Comparative Preparation Example 1 | Comparative Preparation Example 2 | Comparative Preparation Example 3 | Comparative Preparation Example 4 |
|---|---|---|---|---|---|
| Precursor label | | DS1 | DS2 | DS3 | DS4 |
| Doping element M | | — | — | — | — |
| Precipitant, concentration/mol/L | | NaOH, 3 | NaOH, 2 | NaOH, 3 | NaOH, 4 |
| Complexing agent, concentration/mol/L | | Aqueous ammonia, 3 | Aqueous ammonia, 2 | Aqueous ammonia, 4 | Aqueous ammonia, 3 |
| Dispersant, concentration g/L | | PVA, 10 | PEG1000, 10 | PVA, 10 | Polyglycerol, 10 |
| Coprecipitation reaction | Temperature, ° C. | 60 | 55 | 58 | 60 |
| | pH | 11.7 | 13.2 | 13.2 | 11.7 |
| | Speed, rpm | 800 | 450 | 800 | 600 |
| distribution* | | Radial | No obvious radial | Radial | Radial |

| | Precursor | | |
|---|---|---|---|
| | General formula | $D_{50}$, μm | Specific surface area, $m^2/g$ |
| Preparation Example 1 | $(Ni_{0.5}Co_{0.2}Mn_{0.2985}Y_{0.0015})(OH)_2$ | 9.0 | 6.3 |
| Preparation Example 2 | $(Ni_{0.6}Co_{0.2}Mn_{0.1985}Zr_{0.0015})(OH)_2$ | 11.4 | 5.23 |
| Preparation Example 3 | $(Ni_{0.81}Co_{0.09}Mn_{0.0985}La_{0.0015})(OH)_2$ | 12.0 | 4.85 |
| Preparation Example 4 | $(Ni_{0.95}Co_{0.02}Mn_{0.0275}W_{0.001}Y_{0.0015})(OH)_2$ | 8.0 | 4.64 |
| Preparation Example 5 | $(Ni_{0.95}Co_{0.02}Mn_{0.03})(OH)_2$ | 8.2 | 4.70 |
| Comparative Preparation Example 1 | $(Ni_{0.5}Co_{0.2}Mn_{0.3})(OH)_2$ | 11.0 | 5.8 |
| Comparative Preparation Example 2 | $(Ni_{0.6}Co_{0.2}Mn_{0.2})(OH)_2$ | 10.0 | 6.62 |
| Comparative Preparation Example 3 | $(Ni_{0.81}Co_{0.09}Mn_{0.1})(OH)_2$ | 10.0 | 6.5 |
| Comparative Preparation Example 4 | $(Ni_{0.95}Co_{0.02}Mn_{0.03})(OH)_2$ | 11.0 | 5.8 |

Note:
*Primary grain distribution on cross-section of precursor.

It can be seen from the data in Table 2 that, compared with Comparative Preparation Examples 1 to 4, in Preparation Examples 1 to 5, by regulating the conditions for the coprecipitation reaction to satisfy: the temperature ranging from 40° C. to 80° C., the pH value ranging from 10 to 13, the stirring speed ranging from 200 rpm to 550 rpm, and particularly, in combination with the type of doping element M, the precursor satisfying Formula II was agglomerated by the primary crystal grains, and the primary crystal grains on the cross-section of the precursor were non-radially distributed.

The process parameters of Examples 1 to 5 and Comparative Examples 1 to 8 were all listed in Table 3, and the compositions and physical property parameters of the prepared multi-element cathode material were all listed in Table 4.

Example 1

(1) the precursor S1 obtained in Preparation Example 1 was mixed with lithium carbonate to obtain a mixture I, in which the amounts of the above precursor S1 and lithium carbonate satisfied: n(Ni+Co+Mn+Y):n(Li)=1:1.05;

(2) the above mixture I was subjected to primary sintering in an air atmosphere, which includes heating to a temperature T1 of 730° C. at a heating rate V1 of 5° C./min and holding at T1 for a thermostatic duration t1 of 3 hours; and then heating to a temperature T2 of 920° C. at a heating rate V2 of 5° C./min and holding at T2 for a thermostatic duration t2 of 9 hours, the mixture I subjected to the primary sintering was naturally cooled to the room temperature, crushed by a crushing device, and then sieved, to obtain an intermediate product with a disordered internal structure;

(3) the above intermediate product was mixed with MgO to obtain a uniformly coated mixture II, in which the amounts of the above intermediate product and MgO satisfied: n(Ni+Co+Mn+Y):n(Mg)=1:0.0012; and (4) the mixture II was subjected to secondary sintering in an air atmosphere (temperature of 700° C., duration of 6 hours) to obtain a multi-electrode cathode material P1.

Example 2

Example 2 was carried out according to the method of Example 1, with the following differences: in step (1), the precursor S2 prepared in Preparation Example 2 was adopted; and the amounts of the above precursor S2 and lithium carbonate satisfied: n(Ni+Co+Mn+Zr):n(Li)=1:1.06; in step (2), the atmosphere of the primary sintering was an oxygen atmosphere with an oxygen content greater than or equal to 92 V %; and the conditions for the primary sintering were replaced by heating to the temperature T1 of 710° C. at the heating rate V1 of 4° C./min and holding at Tl for the thermostatic duration t1 of 3 hours; and then heating to the temperature T2 of 860° C. at the heating rate V2 of 4° C./min and holding at T2 for the thermostatic duration t2 of 10 hours; in step (3), the coating agent was replaced with $Al_2O_3$, and amounts of the above intermediate product and $Al_2O_3$ satisfied: n(Ni+Co+Mn+Zr):n(Al)=1:0.001. The other conditions are the same as those in Example 1. The multi-element cathode material P2 was obtained.

Example 3

Example 3 was carried out according to the method of Example 1, with the following differences: in step (1), the precursor S3 prepared in Preparation Example 3 was adopted; and the amounts of the above precursor S3 and lithium hydroxide satisfied: n(Ni+Co+Mn+La):n(Li)=1:1.02; in step (2), the atmosphere of the primary sintering was an oxygen atmosphere with an oxygen content greater than or equal to 95 V %; and the conditions for the primary sintering were replaced by heating to the temperature T1 of 600° C. at the heating rate V1 of 2° C./min and holding at Tl for the thermostatic duration t1 of 4 hours; and then heating to the temperature T2 of 785° C. at the heating rate V2 of 2° C./min and holding at T2 for the thermostatic duration t2 of 8 hours; in step (3), the coating agent was replaced with $CeO_2$, and the amounts of the above intermediate product and $CeO_2$ satisfied: n(Ni+Co+Mn+La):n(Ce)=1:0.0008; in step (4), the temperature of the secondary sintering was replaced with 500° C. The other conditions were the same as those in Example 1. The multi-element cathode material P3 was obtained. The SEM image of a cross-section of the multi-element cathode material P3 was shown in FIG. 3. It can be seen from FIG. 3 that internal particles of the multi-element cathode material P3 were disordered and grew non-radially.

Example 4

Example 4 was carried out according to the method of Example 1, with the following differences: in step (1), the precursor S4 prepared in Preparation Example 4 was adopted; and the amounts of the above precursor S4 and lithium hydroxide satisfied: n(Ni+Co+Mn+W+Y):n(Li)=1:1.03; in step (2), the atmosphere of the primary sintering was an oxygen atmosphere with an oxygen content greater than or equal to 95 V %; the conditions for the primary sintering were replaced by heating to the temperature T1 of 600° C. at the heating rate V1 of 2° C./min and holding at T1 for the thermostatic duration t1 of 4 hours; and then heating to the temperature T2 of 725° C. at the heating rate V2 of 2° C./min and holding at T2 for the thermostatic duration t2 of 8 hours; in step (3), the coating agent was replaced with $B_2O_3$, and the amounts of the above intermediate product and $B_2O_3$ satisfied: n(Ni+Co+Mn+W+Y):n(B)=1:0.001; in step (4), the temperature of the secondary sintering was replaced with 350° C. The other conditions were the same as those in Example 1. The multi-element cathode material P4 was obtained. The image of the ion milling cross-section of the multi-element cathode material P4 was shown in FIG. 5. It can be seen from FIG. 5 that internal particles of the multi-element cathode material P4 were disordered and grew non-radially.

Example 5

Example 5 was carried out according to the method of Example 4, with the following differences: in step (1), the precursor S5 prepared in Preparation Example 5 was adopted, and tungsten oxide and yttrium oxide were adopted as the dopants. The amounts of the above precursor S5, tungsten oxide, yttrium oxide, and lithium hydroxide satisfied: n(Ni):n(Co):n(Mn):n(W)n(Y):n(Li)=0.95:0.02:0.0275:0.001:0.0015:1.03. The other conditions were the same as those in Example 4. The multi-element cathode material P5 was obtained.

Comparative Example 1

Comparative Example 1 was carried out according to the method of Example 1, with the following differences: in step (1), the precursor DS1 prepared in Comparative Preparation Example 1 was adopted. The other conditions were the same as those in Example 1. The multi-element cathode material DP1 was obtained. The image of the ion-milled cross-section of the multi-element cathode material DP1 was shown in FIG. 6. It can be seen from FIG. 6 that internal particles of the multi-element cathode material DP1 grew in a radial distribution.

Comparative Example 2

Comparative Example 2 was carried out according to the method of Example 2, with the following differences: in step (1), the precursor DS2 prepared in Comparative Preparation Example 2 was adopted. The other conditions were the same as those in Example 2. The multi-element cathode material DP2 was obtained.

Comparative Example 3

Comparative Example 3 was carried out according to the method of Example 3, with the following differences: in step (1), the precursor DS3 prepared in Comparative Preparation Example 3 was adopted. The other conditions were the same as those in Example 3. The multi-element cathode material DP3 was obtained. The SEM image of a cross-section of the multi-element cathode material DP3 was shown in FIG. 4. It can be seen from FIG. 4 that internal particles of the multi-element cathode material DP3 grew in a radial distribution.

Comparative Example 4

Comparative Example 4 was carried out according to the method of Example 4, with the following differences: in step (1), the precursor DS4 prepared in Comparative Preparation Example 4 was adopted. The other conditions were the same as those in Example 4, and the multi-element cathode material DP4 was obtained.

Comparative Example 5

Comparative Example 5 was carried out according to the method of Example 1, with the following differences: in step (2), the thermostatic duration t1 was 0 hour. The other conditions were the same as those in Example 1, and the multi-element cathode material DP5 was obtained.

Comparative Example 6

Comparative Example 6 was carried out according to the method of Example 2, with the following differences: in step (2), the conditions for the primary sintering were replaced by heating to the temperature T1 of 710° C. at the heating rate V1 of 7° C./min and holding at T1 for the thermostatic duration t1 of 3 hours; and then heating to the temperature T2 of 860° C. at the heating rate V2 of 7° C./min and holding at T2 for the thermostatic duration t2 of 10 hours. The other conditions were the same as those in Example 2, and the multi-element cathode material DP6 was obtained.

Comparative Example 7

Comparative Example 7 was carried out according to the method of Example 3, with the following differences: in step (2), the atmosphere of the primary sintering and the secondary sintering was an oxygen atmosphere with an oxygen content of 85 V %. The other conditions were the same as those in Example 3, and the multi-element cathode material DP7 was obtained.

Comparative Example 8

Comparative Example 8 was carried out according to the method of Example 4, with the following differences: in step (2), the conditions for the primary sintering were replaced by heating to the temperature T1 of 600° C. at the heating rate V1 of 7° C./min; and then heating to the temperature T2 of 725° C. at the heating rate V2 of 7° C./min and holding at T2 for the thermostatic duration t2 of 7 hours. The other conditions were the same as those in Example 4, and the multi-element cathode material DP8 was obtained.

TABLE 3

| | Example 1 | Example 2 | Example 3 | Example 4 | Example 5 |
|---|---|---|---|---|---|
| Precursor label | S1 | S2 | S3 | S4 | S5 |
| Step (1) | | | | | |
| Lithium ratio [1] | 1.05 | 1.06 | 1.02 | 1.03 | 1.03 |
| Amount of dopant [2] | — | — | — | — | W, 0.001 Y, 0.0015 |
| Step (2) | | | | | |
| Sintering atmosphere | Air | Oxygen | Oxygen | Oxygen | Oxygen |
| Atmosphere concentration | — | 92 V % | 95 V % | 95 V % | 95 V % |
| V1, ° C./min | 5 | 4 | 2 | 2 | 2 |
| $T_1$, ° C. | 730 | 710 | 600 | 600 | 600 |
| $t_1$, h | 3 | 3 | 4 | 4 | 4 |
| V2, ° C./min | 5 | 4 | 2 | 2 | 2 |
| $T_2$, ° C. | 920 | 860 | 785 | 725 | 725 |
| $t_2$, h | 9 | 10 | 8 | 8 | 8 |
| Step (3) | | | | | |
| Coating agent type | MgO | $Al_2O_3$ | $CeO_2$ | $B_2O_3$ | $B_2O_3$ |
| Amount of coating agent [3] | 0.0012 | 0.001 | 0.0008 | 0.001 | 0.001 |
| Step (4) | | | | | |
| Sintering atmosphere | Air | Air | Air | Air | Air |
| $T_3$, ° C. | 700 | 700 | 500 | 350 | 350 |
| $t_3$, h | 6 | 6 | 6 | 6 | 6 |

| | Comparative Example 1 | Comparative Example 2 | Comparative Example 3 | Comparative Example 4 | Comparative Example 5 |
|---|---|---|---|---|---|
| Precursor label | DS1 | DS2 | DS3 | DS4 | S1 |
| Step (1) | | | | | |
| Lithium ratio [1] | 1.05 | 1.06 | 1.02 | 1.03 | 1.05 |
| Amount of dopant [2] | — | — | — | — | — |
| Step (2) | | | | | |
| Sintering atmosphere | Air | Oxygen | Oxygen | Oxygen | Air |
| Atmosphere concentration | — | 92 V % | 95 V % | 95 V % | — |
| V1, ° C./min | 5 | 4 | 2 | 2 | 5 |
| $T_1$, ° C. | 730 | 710 | 600 | 600 | 730 |
| $t_1$, h | 3 | 3 | 4 | 4 | 0 |
| V2, ° C./min | 5 | 4 | 2 | 2 | 5 |

TABLE 3-continued

| | | | | | |
|---|---|---|---|---|---|
| $T_2$, ° C. | 920 | 860 | 785 | 725 | 920 |
| $t_2$, h | 9 | 10 | 8 | 8 | 9 |
| Step (3) | | | | | |
| Coating agent type | MgO | $Al_2O_3$ | $CeO_2$ | $B_2O_3$ | MgO |
| Amount of coating agent [3] | 0.0012 | 0.001 | 0.0008 | 0.001 | 0.0012 |
| Step (4) | | | | | |
| Sintering atmosphere | Air | Air | Air | Air | Air |
| $T_3$, ° C. | 700 | 700 | 500 | 350 | 700 |
| $t_3$, h | 6 | 6 | 6 | 6 | 6 |

| | Comparative Example 6 | Comparative Example 7 | Comparative Example 8 |
|---|---|---|---|
| Precursor label | S2 | S3 | S4 |
| Step (1) | | | |
| Lithium ratio [1] | 1.06 | 1.02 | 1.03 |
| Amount of dopant [2] | — | — | — |
| Step (2) | | | |
| Sintering atmosphere | Oxygen | Oxygen | Oxygen |
| Atmosphere concentration | 90 V % | 85 V % | 95 V % |
| V1, ° C./min | 7 | 2 | 7 |
| $T_1$, ° C. | 710 | 600 | 600 |
| $t_1$, h | 3 | 4 | 0 |
| V2, ° C./min | 7 | 2 | 7 |
| $T_2$, ° C. | 860 | 785 | 725 |
| $t_2$, h | 10 | 8 | 7 |
| Step (3) | | | |
| Coating agent type | $Al_2O_3$ | $CeO_2$ | $B_2O_3$ |
| Amount of coating agent [3] | 0.001 | 0.0008 | 0.001 |
| Step (4) | | | |
| Sintering atmosphere | Air | Air | Air |
| $T_3$, ° C. | 700 | 500 | 350 |
| $t_3$, h | 6 | 6 | 6 |

Note:
[1] Molar ratio of lithium source to precursor, calculated in terms of metal elements;
[2] Molar ratio of the above precursors to the above dopants, calculated in terms of metal elements;
and [3] Molar ratio of the above intermediate product to the above coating agent, calculated in terms of metal elements.

TABLE 4

| | Chemical formula | Powder pallet density, g/cm$^3$ |
|---|---|---|
| Example 1 | $Li_{1.05}(Ni_{0.5}Co_{0.2}Mn_{0.2985}Y_{0.0015})Mg_{0.0012}O_2$ | 3.42 |
| Example 2 | $Li_{1.06}(Ni_{0.6}Co_{0.2}Mn_{0.1985}Zr_{0.0015})Al_{0.001}O_2$ | 3.43 |
| Example 3 | $Li_{1.02}(Ni_{0.81}Co_{0.09}Mn_{0.0985}La_{0.0015})Ce_{0.0008}O_2$ | 3.47 |
| Example 4 | $Li_{1.03}(Ni_{0.95}Co_{0.02}Mn_{0.0275}W_{0.001}Y_{0.0015})B_{0.001}O_2$ | 3.45 |
| Example 5 | $Li_{1.03}(Ni_{0.95}Co_{0.02}Mn_{0.0275}W_{0.001}Y_{0.0015})B_{0.001}O_2$ | 3.42 |
| Comparative Example 1 | $Li_{1.05}(Ni_{0.5}Co_{0.2}Mn_{0.3})Mg_{0.0012}O_2$ | 3.17 |
| Comparative Example 2 | $Li_{1.06}(Ni_{0.6}Co_{0.2}.Mn_{0.2})Al_{0.001}O_2$ | 3.19 |
| Comparative Example 3 | $Li_{1.02}(Ni_{0.81}Co_{0.09}Mn_{0.1})Ce_{0.0008}O_2$ | 3.15 |
| Comparative Example 4 | $Li_{1.03}(Ni_{0.95}Co_{0.02}Mn_{0.03})B_{0.001}O_2$ | 3.18 |
| Comparative Example 5 | $Li_{1.05}(Ni_{0.5}Co_{0.2}Mn_{0.2985}Y_{0.0015})Mg_{0.012}O_2$ | 3.23 |
| Comparative Example 6 | $Li_{1.06}(Ni_{0.6}Co_{0.2}Mn_{0.1985}Zr_{0.0015})Al_{0.001}O_2$ | 3.24 |
| Comparative Example 7 | $Li_{1.02}(Ni_{0.81}Co_{0.09}Mn_{0.0985}La_{0.0015})Ce_{0.0008}O_2$ | 3.20 |
| Comparative Example 8 | $Li_{1.03}(Ni_{0.95}Co_{0.02}Mn_{0.0275}W_{0.001}Y_{0.0015})B_{0.001}O_2$ | 3.22 |

TABLE 4-continued

| | Cross-sectional area ratio [4] | Porosity [5], % | Grain boundary density [6] | Proportion of grain boundaries with length ≤1.5 μm is [7], % | Primary particles Average aspect ratio | Primary particles Number Proportion [8], % |
|---|---|---|---|---|---|---|
| Example 1 | ✓ | 1.5 | 3.0 | 83 | 1.1 | 80 |
| Example 2 | ✓ | 1.4 | 2.7 | 89 | 1.03 | 82 |
| Example 3 | ✓ | 1.2 | 2.2 | 92 | 1.0 | 89 |
| Example 4 | ✓ | 1.3 | 2.1 | 90 | 1.05 | 85 |
| Example 5 | ✓ | 1.6 | 2.6 | 80 | 1.06 | 79 |
| Comparative Example 1 | x | 2.3 | 1.1 | 50 | 2.1 | 50 |
| Comparative Example 2 | x | 2.5 | 1.2 | 57 | 1.7 | 55 |
| Comparative Example 3 | x | 2.4 | 1.3 | 65 | 2.5 | 48 |
| Comparative Example 4 | x | 3.0 | 1.0 | 49 | 1.8 | 52 |
| Comparative Example 5 | x | 2.0 | 1.5 | 69 | 1.5 | 69 |
| Comparative Example 6 | x | 2.3 | 1.4 | 70 | 1.55 | 66 |
| Comparative Example 7 | x | 2.0 | 1.6 | 60 | 1.6 | 60 |
| Comparative Example 8 | x | 2.2 | 1.5 | 62 | 1.5 | 63 |

| | $DA_{50}$, μm | $DB_{50}$, μm | $DB_{50}/DA_{50}$ | $FWHM_{(104)}$ | $m(Li_2CO_3)$ + m(LiOH), ppm |
|---|---|---|---|---|---|
| Example 1 | 1.0 | 11 | 11 | 0.225 | 1800 |
| Example 2 | 0.8 | 12 | 15 | 0.230 | 2458 |
| Example 3 | 0.6 | 12 | 20 | 0.222 | 3313 |
| Example 4 | 0.2 | 8 | 40 | 0.235 | 4367 |
| Example 5 | 0.3 | 9 | 30 | 0.235 | 4232 |
| Comparative Example 1 | 3.0 | 12 | 4 | 0.251 | 2500 |
| Comparative Example 2 | 2.5 | 11 | 4 | 0.254 | 3467 |
| Comparative Example 3 | 2.1 | 11 | 5 | 0.255 | 4589 |
| Comparative Example 4 | 1.8 | 12 | 7 | 0.250 | 5672 |
| Comparative Example 5 | 1.6 | 11 | 7 | 0.242 | 2589 |
| Comparative Example 6 | 1.7 | 10 | 6 | 0.252 | 4166 |
| Comparative Example 7 | 2.0 | 11 | 6 | 0.260 | 8985 |
| Comparative Example 8 | 1.6 | 10 | 6 | 0.248 | 4625 |

Note:
[4] If a ratio of the total cross-sectional area of the primary particles with more than 5 grain boundaries to the cross-sectional area of the secondary particles was greater than or equal to 3:4, it was recorded as ✓; otherwise, it was recorded as x;
[5] The porosity on the cross-section of the secondary particles;
[6] The grain boundary density of the secondary particles = a number of interfaces between the primary particles on the cross-section of the secondary particles/a number of the primary particles on the cross-section of the secondary particles;
[7] The number proportion of the grain boundaries having a length less than or equal to 1.5 μm to a total number of the grain boundaries;
[8] The number proportion of the primary particles with the aspect ratio ranging from 0.9 to 1.1.

It can be seen from the data in Tables 2 to 4 that, compared with comparative examples 1 to 8, Examples 1 to 5 adopted the preparation method according to the present disclosure, and the prepared multi-element cathode material had advantages that the internal particles were disordered and grow non-radially, the pallet density was high, and the electrode plates are not prone to fracture; Example 1 to 4 adopted the non-radial doped precursor, and the powder tap density of the material prepared through the double-platform heat preservation process was significantly higher than that of the cathode materials of Comparative Example 1 to 8, which were processed by the same process using the radially distributed precursor. A powder tap density of the material of Example 5 in which the element M was not doped in the precursor stage but added in the stage of preparing the cathode material was slightly lower than that of the material of Example 4 prepared by doping the element M in the precursor stage.

In addition, the materials prepared by the excessively high heating rates V1 and V2 (Comparative Example 6), high Ni content, and insufficient oxygen concentration in the primary sintering (Comparative Example 7), and single-platform primary sintering process (Comparative Example 5 and Comparative Example 8) had a significantly higher alkali content and a correspondingly lower tap density, which makes it easier to produce the fracture when the plates were compacted.

Test Example 1

The positive electrode plates prepared by the multi-element cathode materials of the above examples and comparative examples were subjected to ultimate compaction and fragmentation tests, and the test results were all listed in Table 5.

Specific preparation process of positive electrode plate: the above multi-electrode cathode material, SP, CNT, and polyvinylidene fluoride (PVDF) were mixed in a mass ratio of 97:1:0.8:1.2 with an appropriate amount of N-methylpyrrolidone (NMP) to form a uniform slurry. The slurry was then coated on an aluminum foil. After the drying process, the coated aluminum foil was punched into electrode plate with a size of 112 mm×40 mm by using a die-cutting machine, and the loading amount of the multi-electrode cathode material was 380±2 g/$m^2$.

Method for determining fragmentation of electrode plates: the prepared positive electrode plates were all baked in a vacuum oven at 125° C. for more than 8 hours; then the positive electrode plates were tested by rolling twice to reach a corresponding pallet density; then, the plates were folded by pressing with a flat plate of a fixed weight; finally, the plates were observed for light transmission by using a LED point light source. Meanwhile, the thickness and a length of the positive electrode plates before and after the rolling were recorded, and the thickness compression ratio and an elongations of the positive electrode plates before and after the rolling were calculated. The positive electrode plates were pressed to different pallet densities, and light transmission of the positive electrode plates was observed and statistically analyzed when the plates were folded once, twice, three times, and four times at different pallet densities. The result of the fragmentation of the positive electrode plates was determined based on whether the plates were light-transmitting.

TABLE 5

| Serial number | Powder pallet density g/$cm^3$ | Areal density of the electrode plate g/$cm^2$ | Electrode plate code / | Electrode plate weight g | Ultimate pallet density g/$cm^3$ | Roll-pressing thickness of the electrode plate: Before pressing μm | After pressing μm | Compression ratio / |
|---|---|---|---|---|---|---|---|---|
| Example 1 | 3.42 | 379.7 | A1 | 1.676 | 3.68 | 201 | 119 | 40.80% |
| | | | A2 | 1.676 | 3.64 | 201 | 120 | 40.30% |
| | | | A3 | 1.669 | 3.61 | 201 | 121 | 39.80% |
| | | | A4 | 1.692 | 3.57 | 200 | 122 | 39.00% |
| | | | A5 | 1.692 | 3.54 | 201 | 123 | 38.80% |
| | | | A6 | 1.696 | 3.51 | 201 | 124 | 38.30% |
| | | | A7 | 1.69 | 3.47 | 200 | 125 | 37.50% |
| | | | A8 | 1.678 | 3.41 | 201 | 127 | 36.80% |
| Example 2 | 3.43 | 380.6 | B1 | 1.699 | 3.7 | 180 | 119 | 33.90% |
| | | | B2 | 1.696 | 3.66 | 180 | 120 | 33.30% |
| | | | B3 | 1.697 | 3.66 | 180 | 120 | 33.30% |
| | | | B4 | 1.694 | 3.62 | 180 | 121 | 32.80% |
| | | | B5 | 1.695 | 3.59 | 180 | 122 | 32.20% |
| | | | B6 | 1.695 | 3.56 | 179 | 123 | 31.30% |
| | | | B7 | 1.693 | 3.52 | 180 | 124 | 31.10% |
| Example 3 | 3.47 | 380.4 | C1 | 1.686 | 3.8 | 189 | 116 | 38.60% |
| | | | C2 | 1.689 | 3.77 | 189 | 117 | 38.10% |
| | | | C3 | 1.684 | 3.69 | 189 | 119 | 37.00% |
| | | | C4 | 1.691 | 3.62 | 190 | 121 | 36.30% |
| | | | C5 | 1.687 | 3.59 | 189 | 122 | 35.40% |
| | | | C6 | 1.688 | 3.56 | 189 | 123 | 34.90% |
| | | | C7 | 1.694 | 3.52 | 190 | 124 | 34.70% |
| Example 4 | 3.45 | 379.4 | D1 | 1.642 | 3.74 | 180 | 116 | 35.60% |
| | | | D2 | 1.644 | 3.71 | 178 | 117 | 34.30% |
| | | | D3 | 1.648 | 3.63 | 179 | 119 | 33.50% |
| | | | D4 | 1.65 | 3.57 | 179 | 121 | 32.40% |
| | | | D5 | 1.648 | 3.53 | 179 | 122 | 31.80% |
| | | | D6 | 1.648 | 3.5 | 179 | 123 | 31.30% |
| | | | D7 | 1.654 | 3.47 | 179 | 124 | 30.70% |
| | | | D8 | 1.65 | 3.4 | 180 | 126 | 30.00% |
| Example 5 | 3.42 | 379.6 | E1 | 1.656 | 3.57 | 186 | 121 | 34.90% |
| | | | E2 | 1.642 | 3.53 | 184 | 122 | 33.70% |
| | | | E3 | 1.649 | 3.37 | 186 | 127 | 31.70% |
| | | | E4 | 1.641 | 3.34 | 185 | 128 | 30.80% |
| | | | E5 | 1.652 | 3.32 | 185 | 129 | 30.30% |
| | | | E6 | 1.656 | 3.29 | 185 | 130 | 29.70% |
| Comparative Example 1 | 3.17 | 379.9 | F1 | 1.681 | 3.49 | 177 | 125 | 29.40% |
| | | | F2 | 1.683 | 3.45 | 177 | 126 | 28.80% |
| | | | F3 | 1.688 | 3.36 | 179 | 129 | 27.90% |
| | | | F4 | 1.683 | 3.33 | 177 | 130 | 26.60% |
| | | | F5 | 1.688 | 3.28 | 178 | 132 | 25.80% |
| | | | F6 | 1.686 | 3.25 | 177 | 133 | 24.90% |
| | | | F7 | 1.682 | 3.22 | 177 | 134 | 24.30% |
| | | | F8 | 1.689 | 3.19 | 177 | 135 | 23.70% |
| Comparative Example 2 | 3.19 | 379.3 | G1 | 1.669 | 3.48 | 185 | 124 | 33.00% |
| | | | G2 | 1.673 | 3.45 | 185 | 125 | 32.40% |

TABLE 5-continued

| | | | | | | | | |
|---|---|---|---|---|---|---|---|---|
| | | | G3 | 1.683 | 3.42 | 185 | 126 | 31.90% |
| | | | G4 | 1.684 | 3.39 | 186 | 127 | 31.70% |
| | | | G5 | 1.677 | 3.36 | 186 | 128 | 31.20% |
| | | | G6 | 1.679 | 3.33 | 185 | 129 | 30.30% |
| | | | G7 | 1.678 | 3.3 | 186 | 130 | 30.10% |
| Comparative Example 3 | 3.15 | 380.6 | H1 | 1.708 | 3.34 | 193 | 130 | 32.60% |
| | | | H2 | 1.722 | 3.31 | 197 | 131 | 33.50% |
| | | | H3 | 1.696 | 3.28 | 192 | 132 | 31.30% |
| | | | H4 | 1.7 | 3.25 | 192 | 133 | 30.70% |
| | | | H5 | 1.698 | 3.23 | 193 | 134 | 30.60% |
| | | | H6 | 1.687 | 3.2 | 192 | 135 | 29.70% |
| | | | H7 | 1.686 | 3.17 | 193 | 136 | 29.50% |
| | | | H8 | 1.713 | 3.15 | 192 | 137 | 28.60% |
| Comparative Example 4 | 3.18 | 380.6 | I1 | 1.686 | 3.59 | 188 | 122 | 35.10% |
| | | | I2 | 1.686 | 3.56 | 189 | 123 | 34.90% |
| | | | I3 | 1.693 | 3.52 | 188 | 124 | 34.00% |
| | | | I4 | 1.688 | 3.49 | 188 | 125 | 33.50% |
| | | | I5 | 1.686 | 3.46 | 188 | 126 | 33.00% |
| | | | I6 | 1.688 | 3.43 | 189 | 127 | 32.80% |
| Comparative Example 5 | 3.23 | 376.9 | J1 | 1.595 | 3.57 | 188 | 113 | 39.90% |
| | | | J2 | 1.592 | 3.5 | 188 | 114 | 39.40% |
| | | | J3 | 1.6 | 3.5 | 189 | 116 | 38.60% |
| | | | J4 | 1.613 | 3.47 | 191 | 118 | 38.20% |
| | | | J5 | 1.607 | 3.4 | 190 | 118 | 37.90% |
| | | | J6 | 1.605 | 3.35 | 190 | 119 | 37.40% |
| Comparative Example 6 | 3.24 | 380 | K1 | 1.593 | 3.55 | 183 | 117 | 36.10% |
| | | | K2 | 1.595 | 3.42 | 183 | 118 | 35.50% |
| | | | K3 | 1.592 | 3.35 | 183 | 119 | 35.00% |
| | | | K4 | 1.595 | 3.22 | 183 | 121 | 33.90% |
| | | | K5 | 1.59 | 3.23 | 183 | 122 | 33.30% |
| | | | K6 | 1.592 | 3.12 | 183 | 124 | 32.20% |
| | | | K7 | 1.593 | 3.15 | 183 | 125 | 31.70% |
| Comparative Example 7 | 3.20 | 377.8 | L1 | 1.656 | 3.59 | 191 | 117 | 38.70% |
| | | | L2 | 1.651 | 3.45 | 190 | 118 | 37.90% |
| | | | L3 | 1.648 | 3.35 | 189 | 119 | 37.00% |
| | | | L4 | 1.636 | 3.24 | 190 | 120 | 36.80% |
| | | | L5 | 1.601 | 3.2 | 191 | 122 | 36.10% |
| | | | L6 | 1.599 | 3.19 | 190 | 123 | 35.30% |
| Comparative Example 8 | 3.22 | 379.3 | M1 | 1.605 | 3.47 | 190 | 119 | 37.40% |
| | | | M2 | 1.611 | 3.37 | 191 | 119 | 37.70% |
| | | | M3 | 1.609 | 3.37 | 191 | 122 | 36.10% |
| | | | M4 | 1.605 | 3.24 | 191 | 123 | 35.60% |
| | | | M5 | 1.602 | 3.2 | 189 | 124 | 34.40% |
| | | | M6 | 1.588 | 3.17 | 189 | 125 | 33.90% |

| | Electrode | Length of the electrodeplate | | | Light transmission | | | |
|---|---|---|---|---|---|---|---|---|
| Serial number | plate code / | Before pressing mm | After pressing mm | Elongation / | Single Fold / | Double Fold / | Triple Fold / | Quadruple Fold / |
| Example 1 | A1 | 100.52 | 102.64 | 2.1% | Light-transmitting | ~ | ~ | ~ |
| | A2 | 100.41 | 102.74 | 2.3% | Opaque | | ~ | ~ |
| | A3 | 100.40 | 102.71 | 2.3% | Opaque | | ~ | ~ |
| | A4 | 100.32 | 102.25 | 1.9% | Opaque | Opaque | Light-transmitting | ~ |
| | A5 | 100.72 | 102.29 | 1.6% | Opaque | Opaque | Light-transmitting | ~ |
| | A6 | 100.44 | 102.39 | 1.9% | Opaque | Opaque | Opaque | Light-transmitting |
| | A7 | 100.58 | 102.66 | 2.1% | Opaque | Opaque | Opaque | Opaque |
| | A8 | 100.52 | 102.08 | 1.6% | Opaque | Opaque | Opaque | Opaque |
| Example 2 | B1 | 100.52 | 102.91 | 2.4% | Light-transmitting | ~ | ~ | ~ |
| | B2 | 100.59 | 102.84 | 2.2% | Opaque | Light-transmitting | ~ | ~ |
| | B3 | 100.44 | 102.70 | 2.3% | Opaque | Light-transmitting | ~ | ~ |
| | B4 | 100.44 | 102.59 | 2.1% | Opaque | Light-transmitting | ~ | ~ |
| | B5 | 100.44 | 102.31 | 1.9% | Opaque | Opaque | Light-transmitting | ~ |
| | B6 | 100.60 | 102.52 | 1.9% | Opaque | Opaque | Opaque | Light-transmitting |
| | B7 | 100.46 | 102.36 | 1.9% | Opaque | Opaque | Opaque | Opaque |
| Example 3 | C1 | 100.26 | 102.34 | 2.1% | Light-transmitting | ~ | ~ | ~ |
| | C2 | 100.35 | 102.40 | 2.0% | Opaque | Light-transmitting | ~ | ~ |

TABLE 5-continued

| | | | | | | | | |
|---|---|---|---|---|---|---|---|---|
| | C3 | 100.40 | 102.35 | 1.9% | Opaque | Light-transmitting | Light-transmitting | ~ |
| | C4 | 100.36 | 102.30 | 1.9% | Opaque | Opaque | Opaque | Light-transmitting |
| | C5 | 100.33 | 102.18 | 1.8% | Opaque | Opaque | Opaque | Opaque |
| | C6 | 100.27 | 102.16 | 1.9% | Opaque | Opaque | Opaque | Opaque |
| | C7 | 100.42 | 102.14 | 1.7% | Opaque | Opaque | Opaque | Opaque |
| Example 4 | D1 | 100.27 | 102.63 | 2.1% | Light-transmitting | ~ | ~ | ~ |
| | D2 | 100.42 | 102.42 | 2.1% | Opaque | ~ | ~ | ~ |
| | D3 | 100.30 | 102.39 | 2.0% | Opaque | Light-transmitting | ~ | ~ |
| | D4 | 100.56 | 102.50 | 2.1% | Opaque | Opaque | ~ | ~ |
| | D5 | 100.30 | 102.44 | 1.9% | Opaque | Opaque | Light-transmitting | ~ |
| | D6 | 100.33 | 102.44 | 1.9% | Opaque | Opaque | Opaque | Opaque |
| | D7 | 100.36 | 102.30 | 1.8% | Opaque | Opaque | Opaque | Opaque |
| | D8 | 100.36 | 102.16 | 1.7% | Opaque | Opaque | Opaque | Opaque |
| Example 5 | E1 | 100.40 | 102.09 | 1.7% | Light-transmitting | ~ | ~ | ~ |
| | E2 | 100.52 | 101.53 | 1.0% | Opaque | Light-transmitting | ~ | ~ |
| | E3 | 100.44 | 102.01 | 1.6% | Opaque | Light-transmitting | ~ | ~ |
| | E4 | 100.58 | 102.04 | 1.5% | Opaque | Opaque | Light-transmitting | ~ |
| | E5 | 100.61 | 102.02 | 1.4% | Opaque | Opaque | Light-transmitting | ~ |
| | E6 | 100.61 | 102.01 | 1.4% | Opaque | Opaque | Opaque | Opaque |
| Comparative Example 1 | F1 | 100.44 | 102.12 | 1.7% | Light-transmitting | ~ | ~ | ~ |
| | F2 | 100.43 | 102.55 | 2.1% | Light-transmitting | ~ | ~ | ~ |
| | F3 | 100.66 | 102.74 | 2.1% | Light-transmitting | ~ | ~ | ~ |
| | F4 | 100.55 | 102.34 | 1.8% | Opaque | Light-transmitting | ~ | ~ |
| | F5 | 100.68 | 102.45 | 1.8% | Opaque | Light-transmitting | ~ | ~ |
| | F6 | 100.54 | 102.58 | 2.0% | Opaque | Opaque | Light-transmitting | ~ |
| | F7 | 100.49 | 102.39 | 1.9% | Opaque | Opaque | Opaque | Opaque |
| | F8 | 100.47 | 102.34 | 1.9% | Opaque | Opaque | Opaque | Opaque |
| Comparative Example 2 | G1 | 100.35 | 102.35 | 2.0% | Light-transmitting | ~ | ~ | ~ |
| | G2 | 100.31 | 102.25 | 1.9% | Opaque | Light-transmitting | ~ | ~ |
| | G3 | 100.36 | 102.16 | 1.8% | Opaque | Light-transmitting | ~ | ~ |
| | G4 | 100.36 | 102.15 | 1.8% | Opaque | Light-transmitting | ~ | ~ |
| | G5 | 100.33 | 102.02 | 1.7% | Opaque | Opaque | Opaque | Opaque |
| | G6 | 100.30 | 101.88 | 1.6% | Opaque | Opaque | Opaque | Opaque |
| | G7 | 100.41 | 101.97 | 1.6% | Opaque | Opaque | Opaque | Opaque |
| Comparative Example 3 | H1 | 100.39 | 101.97 | 1.6% | Light-transmitting | ~ | ~ | ~ |
| | H2 | 100.36 | 102.17 | 1.8% | Opaque | Light-transmitting | ~ | ~ |
| | H3 | 100.41 | 102.06 | 1.6% | Opaque | Light-transmitting | ~ | ~ |
| | H4 | 100.53 | 101.94 | 1.4% | Opaque | Light-transmitting | ~ | ~ |
| | H5 | 100.34 | 101.91 | 1.6% | Opaque | Light-transmitting | ~ | ~ |
| | H6 | 100.30 | 101.65 | 1.3% | Opaque | Opaque | Light-transmitting | ~ |
| | H7 | 100.38 | 101.92 | 1.5% | Opaque | Opaque | Light-transmitting | ~ |
| | H8 | 100.32 | 101.79 | 1.5% | Opaque | Opaque | Opaque | Opaque |
| Comparative Example 4 | I1 | 100.31 | 102.19 | 1.9% | Light-transmitting | ~ | ~ | ~ |
| | I2 | 100.45 | 102.06 | 1.6% | Light-transmitting | ~ | ~ | ~ |
| | I3 | 100.43 | 101.95 | 1.5% | Light-transmitting | ~ | ~ | ~ |
| | I4 | 100.40 | 101.99 | 1.6% | Opaque | Light-transmitting | ~ | ~ |
| | I5 | 100.40 | 102.08 | 1.7% | Opaque | Light-transmitting | ~ | ~ |
| | I6 | 100.37 | 101.81 | 1.4% | Opaque | Opaque | Opaque | Opaque |

TABLE 5-continued

| | | | | | | | | |
|---|---|---|---|---|---|---|---|---|
| Comparative Example 5 | J1 | 100.19 | 102.08 | 1.9% | Fracture | ~ | ~ | ~ |
| | J2 | 100.24 | 102.36 | 2.1% | Fracture | ~ | ~ | ~ |
| | J3 | 100.49 | 102.55 | 2.0% | Fracture | ~ | ~ | ~ |
| | J4 | 100.41 | 102.25 | 1.8% | Fracture | ~ | ~ | ~ |
| | J5 | 100.55 | 102.38 | 1.8% | Light-transmitting | ~ | ~ | ~ |
| | J6 | 100.37 | 102.15 | 1.8% | Opaque | | | |
| Comparative Example 6 | K1 | 100.29 | 102.06 | 1.8% | Fracture | ~ | ~ | ~ |
| | K2 | 100.45 | 102.29 | 1.8% | Light-transmitting | ~ | ~ | ~ |
| | K3 | 100.39 | 102.19 | 1.8% | Light-transmitting | ~ | ~ | ~ |
| | K4 | 100.53 | 101.78 | 1.2% | Opaque | Light-transmitting | ~ | ~ |
| | K5 | 100.11 | 101.85 | 1.7% | Opaque | Light-transmitting | ~ | ~ |
| | K6 | 100.70 | 101.69 | 1.0% | Opaque | Opaque | Light-transmitting | ~ |
| | K7 | 100.67 | 101.52 | 0.8% | Opaque | Opaque | Opaque | Opaque |
| Comparative Example 7 | L1 | 100.21 | 102.18 | 2.0% | Fracture | ~ | ~ | ~ |
| | L2 | 100.30 | 102.21 | 1.9% | Light-transmitting | Fracture | ~ | ~ |
| | L3 | 100.42 | 102.46 | 2.0% | Light-transmitting | Light-transmitting | ~ | ~ |
| | L4 | 100.58 | 102.34 | 1.7% | Opaque | Light-transmitting | ~ | ~ |
| | L5 | 100.67 | 102.25 | 1.6% | Opaque | Light-transmitting | Light-transmitting | Light-transmitting |
| | L6 | 100.61 | 102.01 | 1.4% | Opaque | Opaque | Opaque | Opaque |
| Comparative Example 8 | M1 | 100.37 | 102.15 | 1.8% | Light-transmitting | ~ | ~ | ~ |
| | M2 | 100.66 | 102.27 | 1.6% | Light-transmitting | ~ | ~ | ~ |
| | M3 | 100.51 | 102.02 | 1.5% | Light-transmitting | ~ | ~ | ~ |
| | M4 | 100.22 | 101.73 | 1.5% | Opaque | Light-transmitting | ~ | ~ |
| | M5 | 100.51 | 101.85 | 1.3% | Opaque | Light-transmitting | ~ | ~ |
| | M6 | 100.30 | 101.30 | 1.0% | Opaque | Opaque | Opaque | Opaque |

Note:
~ indicates that no further testing will be performed after light is transmitted under this condition.

It can be seen from the data in Table 5 that, when the positive electrode plate prepared by the multi-element cathode material P1 of Example 1 was subjected to the ultimate compaction, the corresponding ultimate pallet densities of the positive electrode plate that was opaque after the single-fold and the double-fold were 3.64 g/cm$^3$ and 3.57 g/cm$^3$, respectively (taking Example 1 as an example, the ultimate pallet density corresponding to the positive electrode plate A2 that was opaque after the first single-fold, and the ultimate pallet density corresponding to the positive electrode plate A4 that was opaque after the first double-fold. When the positive electrode plate prepared by the multi-element cathode material P2 of Example 2 was subjected to the ultimate compaction, the corresponding ultimate pallet densities of the positive electrode plate that was opaque after the single-fold and the double-fold were 3.66 g/cm$^3$ and 3.62 g/cm$^3$, respectively. When the positive electrode plate prepared by the multi-element cathode material P3 of Example 3 was subjected to the ultimate compaction, the corresponding limit pallet densities of the positive electrode plate that was opaque after the single-fold and the double-fold were 3.77 g/cm$^3$ and 3.59 g/cm$^3$, respectively. When the positive electrode plate prepared by the multi-element cathode material P4 of Example 4 was subjected to the ultimate compaction, the corresponding ultimate pallet densities of the positive electrode plate that was opaque after the single-fold and the double-fold were 3.71 g/cm$^3$ and 3.57 g/cm$^3$, respectively. The pallet densities of these material plates were higher than the results in the corresponding comparative examples.

The SEM images of cross-sections of the positive electrode plate prepared by the multi-element cathode material P1 of Example 1 after the ultimate compaction were shown in FIG. 7 (single-fold) and FIG. 8 (double-fold). Under a higher ultimate compaction, the secondary particles were easy to soften, which was equivalent to relieving part of rolling pressure. Thus, the extrusion of the secondary spheres on the aluminum foil plate can be reduced. In this way, the fracture of the plate can be reduced, and meanwhile, the electrical properties of the battery can still meet use requirements well.

The SEM images of a cross-section of the positive electrode plate prepared by the multi-element cathode material DP1 of Comparative Example 1 after the ultimate compaction were shown in FIGS. 9 (single-fold) and 10 (double-fold). Even when the secondary particles were subjected to a smaller ultimate compaction, a radial distribution of the internal structure of the multi-component cathode material DP1 caused its secondary spheres to be less likely to deform, and the pressure acting on the secondary spheres was directly transmitted to the aluminum foil, causing the fracture of the aluminum foil.

The preferred embodiments of the present disclosure are described in detail above. However, the present disclosure is not limited thereto. Within the scope of the technical concept of the present disclosure, various simple modifications can be made to the technical solutions of the present disclosure, including the combination of various technical features in any other suitable manner. These simple modifications and combinations should also be regarded as the contents disclosed by the present disclosure and are all within the protection scope of the present disclosure.

What is claimed is:

1. A multi-element cathode material, wherein the multi-element cathode material is composed of secondary particles agglomerated by primary particles, wherein:

a ratio of a total cross-sectional area of the primary particles with more than 5 grain boundaries to a cross-sectional area of the secondary particles is greater than or equal to 0.75 and less than 1;

a porosity on a cross-section of the secondary particles is more than 0% and less than or equal to 2%; and the grain boundaries are each a contour line of an interface, on the cross-section of the secondary particles, between the primary particles with the same structure but different orientations, and the grain boundaries have each a length greater than or equal to 0.1 μm;

the cross-section of the secondary particles refers to a cross-section of particles obtained by ion milling with a cross-sectional diameter equal to an average particle size $DB_{50}$ of the secondary particles.

2. The multi-element cathode material according to claim 1, wherein:

the number of the grain boundaries having a length less than or equal to 1.5 μm accounts for more than 70% of the total number of the grain boundaries.

3. The multi-electrode material according to claim 2, wherein a grain boundary density of the secondary particles is greater than or equal to 1.8, wherein the grain boundary density is a ratio of the number of interfaces, on the cross-section of the secondary particles, between the primary particles to the number of the primary particles on the cross-section of the secondary particles.

4. The multi-element cathode material according to claim 2, wherein an average aspect ratio of the primary particles is less than or equal to 1.5.

5. The multi-element cathode material according to claim 1, wherein:

an average particle size $DB_{50}$ of the secondary particles and an average particle size $DA_{50}$ of the primary particles satisfy: $10 \le DB_{50}/DA_{50} \le 40$.

6. The multi-element cathode material according to claim 1, wherein the multi-electrode cathode material has a composition represented by Formula I:

$$Li_a(Ni_xCo_yMn_zM_b)G_cO_2, \quad (I)$$

where 1≤a≤1.2, 0<b≤0.05, 0≤c<0.05, 0.3≤x<1,0<y<0.5, 0<<<0.5, andx+y+z+b=1; and M and G are each independently selected from at least one element of Mg, Ti, W, V, Ta, Zr, La, Ce, Er, Sr, Si, B, Al, Co, and Y.

7. The multi-element cathode material according to claim 1, wherein:

in an X-ray diffraction, XRD, pattern, the multi-element cathode material has a characteristic diffraction peak of a (104) crystal plane, a full width at half maximum $FWHM_{(104)}$ of the characteristic diffraction peak of the (104) crystal plane ranging from 0.2 to 0.24; and the multi-electrode cathode material has a single-layered $\alpha$-$NaFeO_2$ type structure.

8. The multi-element cathode material according to claim 1, wherein:

a total residual alkali content of the multi-element cathode material satisfies: 0 ppm<$m(Li_2CO_3)$+m(LiOH)<6000 ppm.

9. A method for preparing a multi-element cathode material according to claim 1, the method comprising:

step 1 of mixing a precursor having a composition represented by Formula (II) with a lithium source to obtain a mixture I, the precursor being agglomerated by primary crystal grains, and the primary crystal grains on a cross-section of the precursor being non-radially distributed;

step 2 of performing a primary sintering on the mixture I in an oxygen-containing atmosphere to obtain an intermediate product, conditions for the primary sintering comprising: heating to a temperature T1=400° C. to 760° C. at a heating rate V1=1° C./min to 6° C./min and holding at the temperature T1 for a thermostatic duration t1; and heating to a temperature T2=710° C. to 950° C. at a heating rate V2=1° C./min to 6° C./min and holding at the temperature T2 for a thermostatic duration t2;

step 3 of mixing the intermediate product with a coating agent optionally containing G to obtain a mixture II; and step 4 of performing a secondary sintering on the intermediate product or the mixture II in an oxygen-containing atmosphere to obtain the multi-element cathode material, wherein:

in terms of metallic elements, when a nickel content in the precursor is greater than or equal to 60 mol %, an oxygen concentration in the oxygen-containing atmosphere is greater than or equal to 92 vol %;

$$(Ni_\alpha Co_\beta Mn_\gamma M_\delta)(OH)_2 \quad \text{(II), where:}$$

0.3<α<1, 0<β<0.5, 0<γ<0.5, 0≤δ≤0.05, and α+β+γ+8=1; and

M and G are each independently selected from at least one element of Mg, Ti, W, V, Ta, Zr, La, Ce, Er, Sr, Si, B, Al, Co, and Y.

10. The method according to claim 9, wherein:

in step (1), a $D_{50}$ of the precursor ranges from 8 μm to 14 μm;

a specific surface area of the precursor ranges from 3 $m^2/g$ to 7 $m^2/g$;

amounts of the precursor and the lithium source satisfy: n(Ni+Co+Mn+M):n(Li)=1:1 to 1.2; and the precursor is prepared by: contacting, in an inert atmosphere, a mixed metallic salt solution containing a nickel source, a cobalt source, a manganese source, and an optional dopant containing M with a precipitant, a complexing agent, and a dispersant for a coprecipitation reaction to obtain a coprecipitation reaction product, and sequentially performing washing and drying on the obtained coprecipitation reaction product to obtain the precursor.

11. The method according to claim 10, wherein conditions for the coprecipitation reaction comprise: a temperature ranging from 40° C. to 80° C., a pH value ranging from 10 to 13, and a stirring speed ranging from 200 rpm to 550 rpm.

12. The method according to claim 10, wherein in the mixed metallic salt solution, amounts of the nickel source, the cobalt source, the manganese source, and the dopant satisfy n(Ni):n(Co):n(Mn):n(M), where: 0.3≤n(Ni)<1, 0<n(Co)<0.5, 0<n(Mn)<0.5, and 0≤n(M)≤0.05.

13. The method according to claim 9, wherein in step (2), conditions for the primary sintering comprise:

the heating rate V1 ranging from 1° C./min to 3° C./min; the temperature T1 ranging from 500° C. to 750° C.; and the thermostatic duration t1 ranging from 2 hours to 6 hours; and the heating rate V2 ranging from 1° C./min to 3° C./min; the temperature T2 ranging from 710° C. to 920° C.; and the thermostatic duration t2 ranging from 5 hours to 13 hours.

14. The method according to claim 9, wherein in step (3), amounts of the intermediate product and the coating agent satisfy n(Ni+Co+Mn+M):n(G)=1: n(G), where 0≤n(G) ≤0.05.

15. The method according to claim 14, wherein the coating agent is selected from at least one of oxide, hydroxide, and carbonate that contain G.

16. The method according to claim 14, wherein in step (4), conditions for the secondary sintering comprise:

a temperature T3 ranging from 300° C. to 800° C.; and a duration t3 ranging from 4 hours to 10 hours.

17. The method according to claim 9, wherein in step (4), the multi-element cathode material has a composition represented by Formula I:

$$Li_a(Ni_xCo_yMn_zM_b)G_cO_2 \quad \text{(I)},$$

where 1≤a≤1.2, 0<b≤0.05, 0≤c≤0.05, 0.3≤x<1, 0<y<0.5, 0<z<0.5, and x+y+z+b=1; and M and G are each independently selected from at least one element of Mg, Ti, W, V, Ta, Zr, La, Ce, Er, Sr, Si, B, Al, Co, and Y.

18. A positive electrode plate, wherein an active material layer of the positive electrode plate comprises the multi-element cathode material according to claim 1.

19. A lithium-ion battery, comprising the positive electrode plate according to claim 18.

* * * * *